(12) United States Patent
Aknin et al.

(10) Patent No.: US 11,230,150 B2
(45) Date of Patent: Jan. 25, 2022

(54) TRANSVERSE WHEEL SUSPENSION SYSTEM

(71) Applicant: REE AUTOMOTIVE LTD, Herzliya (IL)

(72) Inventors: Amit Aknin, Karkom (IL); Ran Dekel, Nofit (IL); Ahishay Sardes, Tel-Aviv (IL)

(73) Assignee: REE AUTOMOTIVE LTD, Herzliya (IL)

( * ) Notice: Subject to any disclaimer, the term of this patent is extended or adjusted under 35 U.S.C. 154(b) by 0 days.

(21) Appl. No.: 17/282,323

(22) PCT Filed: Dec. 22, 2020

(86) PCT No.: PCT/IL2020/051318
§ 371 (c)(1),
(2) Date: Apr. 1, 2021

(87) PCT Pub. No.: WO2021/137210
PCT Pub. Date: Jul. 8, 2021

(65) Prior Publication Data
US 2021/0354522 A1 Nov. 18, 2021

Related U.S. Application Data

(60) Provisional application No. 62/954,730, filed on Dec. 30, 2019.

(51) Int. Cl.
*B60G 3/20* (2006.01)
*B62D 3/02* (2006.01)
(Continued)

(52) U.S. Cl.
CPC .............. *B60G 3/20* (2013.01); *B60K 7/0007* (2013.01); *B62D 3/02* (2013.01); *B62D 5/0418* (2013.01)

(58) Field of Classification Search
CPC ... B60G 3/20; B60G 3/18; B60G 3/26; B60G 3/265; B60K 7/0007; B62D 3/02; B62D 5/0418
See application file for complete search history.

(56) References Cited

U.S. PATENT DOCUMENTS 5,451,073 A * 9/1995 Inoue ...................... B60G 3/26
280/124.145
5,498,019 A * 3/1996 Adato ...................... B60G 3/26
280/124.136
(Continued)

OTHER PUBLICATIONS

International Search Report for PCT Appl. No. PCT/IL2020/051318 dated Mar. 14, 2021.

*Primary Examiner* — Tony H Winner
*Assistant Examiner* — Michael R Stabley
(74) *Attorney, Agent, or Firm* — Pearl Cohen Zedek Latzer Baratz LLP

(57) ABSTRACT

A wheel suspension system is disclosed. The wheel suspension system may include a suspension assembly that may include a sub-frame adapted to be connected to a reference frame of a vehicle, a wheel interface adapted to rotatably support a wheel of the vehicle and to define a wheel rotation axis and a wheel rotation plane, and one or more linking units. Components of the linking unit(s) may be pivotally connected to each other, to sub-frame and to the wheel interface using pivoting connection that may cause components of the linking unit(s) to rotate about axes that are substantially perpendicular to the wheel rotation axis. The components of the linking unit(s) may be dimensioned, and positions of the pivoting connections may be set to cause a substantially linear motion of the wheel interface along a reference wheel interface motion axis that is perpendicular to the wheel rotation axis.

20 Claims, 18 Drawing Sheets

(51) Int. Cl.
    *B60K 7/00*        (2006.01)
    *B62D 5/04*        (2006.01)

(56) References Cited

U.S. PATENT DOCUMENTS

| | | | | |
|---|---|---|---|---|
| 5,984,330 | A * | 11/1999 | Hasshi | B60G 3/265 |
| | | | | 280/124.146 |
| 7,784,805 | B2 * | 8/2010 | Morgan | B60G 3/20 |
| | | | | 280/124.134 |
| 8,235,404 | B2 * | 8/2012 | Dada | B62D 7/22 |
| | | | | 280/124.127 |
| 2005/0236797 | A1 | 10/2005 | Deal et al. | |
| 2009/0026725 | A1 | 1/2009 | Haeusler et al. | |

\* cited by examiner

TRANSVERSE WHEEL SUSPENSION SYSTEM

CROSS-REFERENCE TO RELATED APPLICATIONS

This application is a National Phase Application of PCT International Application No. PCT/IL2020/051318, International Filing Date Dec. 22, 2020, claiming the benefit of U.S. Provisional Patent Application No. 62/954,730, filed Dec. 30, 2019, which are hereby incorporated by reference.

FIELD OF THE INVENTION

The present invention relates to the field of suspension systems for vehicles, and more particularly, to wheel suspension system.

BACKGROUND OF THE INVENTION

Transverse suspension systems are widely used in vehicles. Some current transverse suspension systems may provide independent suspension for each of the wheels of the vehicle. One example of current transverse suspension system is a double wishbone suspension system. The double wishbone suspension system includes two wishbone arms each pivotally couplable at its first end to a reference frame of the vehicle using two pivoting connections and at its second end to a wheel interface using one pivoting connection. Another example of current transverse suspension system is a MacPherson strut suspension system. The MacPherson strut suspension system includes a single wishbone arm and a telescopic shock absorber that is also used as a steering pivot.

SUMMARY OF THE INVENTION

One aspect of the present invention may provide a wheel suspension system, the wheel suspension system may include: a suspension assembly including: a sub-frame adapted to be connected to a reference frame of a vehicle; a wheel interface adapted to rotatably support a wheel of the vehicle, the wheel interface defines a wheel rotation axis and a wheel rotation plane; and one or more linking units each including: a first arm pivotally connected at its first end to a first end of the wheel interface using a first pivoting connection; a second arm pivotally connected at its first end to a second end of the wheel interface using a second pivoting connection; and a linking member pivotally connected at a first linking location to a second end of the first arm using a third pivoting connection, pivotally connected at a second linking location to a second end of the second arm using a fourth pivoting connection, and pivotally connected at a third linking location to the sub-frame using a fifth pivoting connection, the third linking location is at a predetermined offset from a reference axis extending between the first linking location and the second linking location; the first pivoting connection, the second pivoting connection, the third pivoting connection, the fourth pivoting connection and the fifth pivoting connection are substantially parallel to the wheel rotation plane; the first arm, the second arm and the linking member are dimensioned and positions of the first pivoting connection, the second pivoting connection, the third pivoting connection, the fourth pivoting connection and the fifth pivoting connection are set to cause a substantially linear motion of the wheel interface along a reference wheel interface motion axis that is perpendicular to the wheel rotation axis.

In some embodiments, the first pivoting connection, the second pivoting connection, the third pivoting connection, the fourth pivoting connection and the fifth pivoting connection to cause rotation of the first arm, the second arm and the linking member about axes that are substantially perpendicular to the wheel rotation axis.

In some embodiments, the first arm, the second arm and the linking member of the one or more linking units extend in one or more co-planar planes that are substantially perpendicular to the wheel rotation plane.

In some embodiments, the wheel interface and at least a portion of each of the first arm, the second arm and linking member of the one or more linking units are positioned within a rim of the wheel of the vehicle when the wheel is assembled into the wheel suspension system.

In some embodiments, the wheel suspension system may further include one or more shock absorbers each comprising one or more dampers. In some embodiments, each one of the or more shock absorbers comprising one or more springs. In some embodiments, each of the one or more shock absorbers comprises one or more of dampers and springs.

In some embodiments, the one or more shock absorbers are pivotally connected at its first end to the sub-frame or pivotally connectable to the reference frame, and pivotally connected at its second end to one of: the first arm, the second arm and the linking member of the one or more linking units.

In some embodiments, the wheel suspension system may further include a steering assembly adapted to steer at least a portion of the suspension assembly with respect to the reference frame.

In some embodiments, the steering assembly may include: one or more steering arms pivotally connected at their first ends to the sub-frame of the suspension assembly and connectable at their second ends to the reference frame of the vehicle using steerable pivoting connections; and a steering transmission unit pivotally connected to the sub-frame using a steerable pivoting connections.

In some embodiments, the steering assembly includes a steering motor for generating a rotational motion. In some embodiments, the steering transmission unit is coupled to the steering motor and is capable of transmitting the rotational motion generated by the steering motor to the sub-frame to steer the entire suspension assembly.

In some embodiments, the steering assembly is capable to steer the wheel interface of the suspension assembly and wherein: the wheel interface may include: a wheel interface coupler pivotally connected at its lateral sides to the linking member of the one or more linking units at the third linking location thereof using the fifth pivoting connection to enable the substantially linear motion of the wheel interface coupler along the reference wheel interface motion axis, and the wheel support member pivotally connected at one or more of its ends to one or more ends of the wheel interface coupler using one or more steerable pivoting connections to enable steering of the wheel interface; and the steering assembly may include: a steering rod connected to the wheel support member of the wheel interface, the steering rod defines a steering axis about which the wheel support member may steer; a steering motor for generating a rotational motion; and a steering transmission unit for transmitting the rotational motion generated by the steering motor to the steering rod to steer the wheel interface.

In some embodiments, the wheel suspension system may further include a drivetrain assembly comprising at least a rotatable drivetrain shaft extending through an aperture within the wheel interface, the rotatable drivetrain shaft is capable of transmitting a rotational motion to the wheel when the wheel is assemblies into the wheel suspension system.

In some embodiments, the drivetrain assembly may further include: a drivetrain motor for generating a rotational motion; and a drivetrain transmission unit for transmitting the rotational motion generated by the drivetrain motor to the rotatable drivetrain shaft.

Another aspect of the present invention may provide a wheel suspension system, the wheel suspension system may include: a suspension assembly including: a sub-frame adapted to be connected to a reference frame of a vehicle; a wheel interface adapted to rotatably support a wheel of the vehicle, the wheel interface defines a wheel rotation axis and a wheel rotation plane; and one or more linking units each including: a first arm pivotally connected at its first end to a first end of the sub-frame using a first pivoting connection; a second arm pivotally connected at its first end to a second end of the sub-frame using a second pivoting connection; and a linking member pivotally connected at a first linking location to a second end of the first arm using a third pivoting connection, pivotally connected at a second linking location to a second end of the second arm using a fourth pivoting connection, and pivotally connected at a third linking location to wheel interface using a fifth pivoting connection, the third linking location is disposed at a predetermined first offset from a first reference axis extending between the first linking location and the second linking location and a second reference axis extending between the first end of the first arm and the first end of the second arm is disposed at a predetermined second offset from the first reference axis; the first arm, the second arm and the linking member are dimensioned and positions of the first pivoting connection, the second pivoting connection, the third pivoting connection, the fourth pivoting connection and the fifth pivoting connection are set to cause a substantially linear motion of the wheel interface along a reference wheel interface motion axis that is perpendicular to the wheel rotation axis.

In some embodiments, the first pivoting connection, the second pivoting connection, the third pivoting connection, the fourth pivoting connection and the fifth pivoting connection to cause rotation of the first arm, the second arm and the linking member about axes that are substantially perpendicular to the wheel rotation axis.

In some embodiments, the first arm, the second arm and the linking member of the one or more linking units extend in one or more co-planar planes that are substantially perpendicular to the wheel rotation plane.

In some embodiments, the wheel interface and at least a portion of each of the first arm, the second arm and linking member of the one or more linking units are positioned within a rim of the wheel of the vehicle when the wheel is assembled into the wheel suspension system.

In some embodiments, the wheel suspension system may further include one or more shock absorbers each comprising one or more dampers. In some embodiments, each one of the or more shock absorbers comprising one or more springs. In some embodiments, each of the one or more shock absorbers comprises one or more of dampers and springs.

In some embodiments, the one or more shock absorbers are pivotally connected at its first end to the sub-frame or pivotally connectable to the reference frame, and pivotally connected at its second to one of: the first arm, the second arm, and the linking member of the one or more linking units.

In some embodiments, the wheel suspension system may further include a steering assembly adapted to steer at least a portion of the suspension assembly with respect to the reference frame. In some embodiments, the steering assembly is adapted to steer the entire suspension assembly with respect to the reference frame. In some embodiments, the steering assembly may include: one or more steering arms pivotally connected at their first ends to the sub-frame of the suspension assembly and connectable at their second ends to the reference frame of the vehicle using steerable pivoting connections; and a steering transmission unit pivotally connected to the sub-frame using a steerable pivoting connections. In some embodiments, the steering assembly includes a steering motor for generating a rotational motion. In some embodiments, the steering transmission unit is coupled to the steering motor and is capable of transmitting the rotational motion generated by the steering motor to the sub-frame to steer the entire suspension assembly.

In some embodiments, the steering assembly is capable to steer the wheel interface of the suspension assembly and wherein: the wheel interface may include: a wheel interface coupler pivotally connected at its lateral sides to the linking member of the one or more linking units at the third linking location thereof using the fifth pivoting connection to enable the substantially linear motion of the wheel interface coupler along the reference wheel interface motion axis, and the wheel support member pivotally connected at one or more of its ends to one or more ends of the wheel interface coupler using one or more steerable pivoting connections to enable steering of the wheel interface; and the steering assembly may include: a steering rod connected to the wheel support member of the wheel interface, the steering rod defines a steering axis about which the wheel support member may steer; a steering motor for generating a rotational motion; and a steering transmission unit for transmitting the rotational motion generated by the steering motor to the steering rod to steer the wheel interface.

In some embodiments, the wheel suspension system may further include a drivetrain assembly comprising at least a rotatable drivetrain shaft extending through an aperture within the wheel interface, the rotatable drivetrain shaft is capable of transmitting a rotational motion to the wheel when the wheel is assemblies into the wheel suspension system.

In some embodiments, the drivetrain assembly may further include: a drivetrain motor for generating a rotational motion; and a drivetrain transmission unit for transmitting the rotational motion generated by the drivetrain motor to the rotatable drivetrain shaft.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
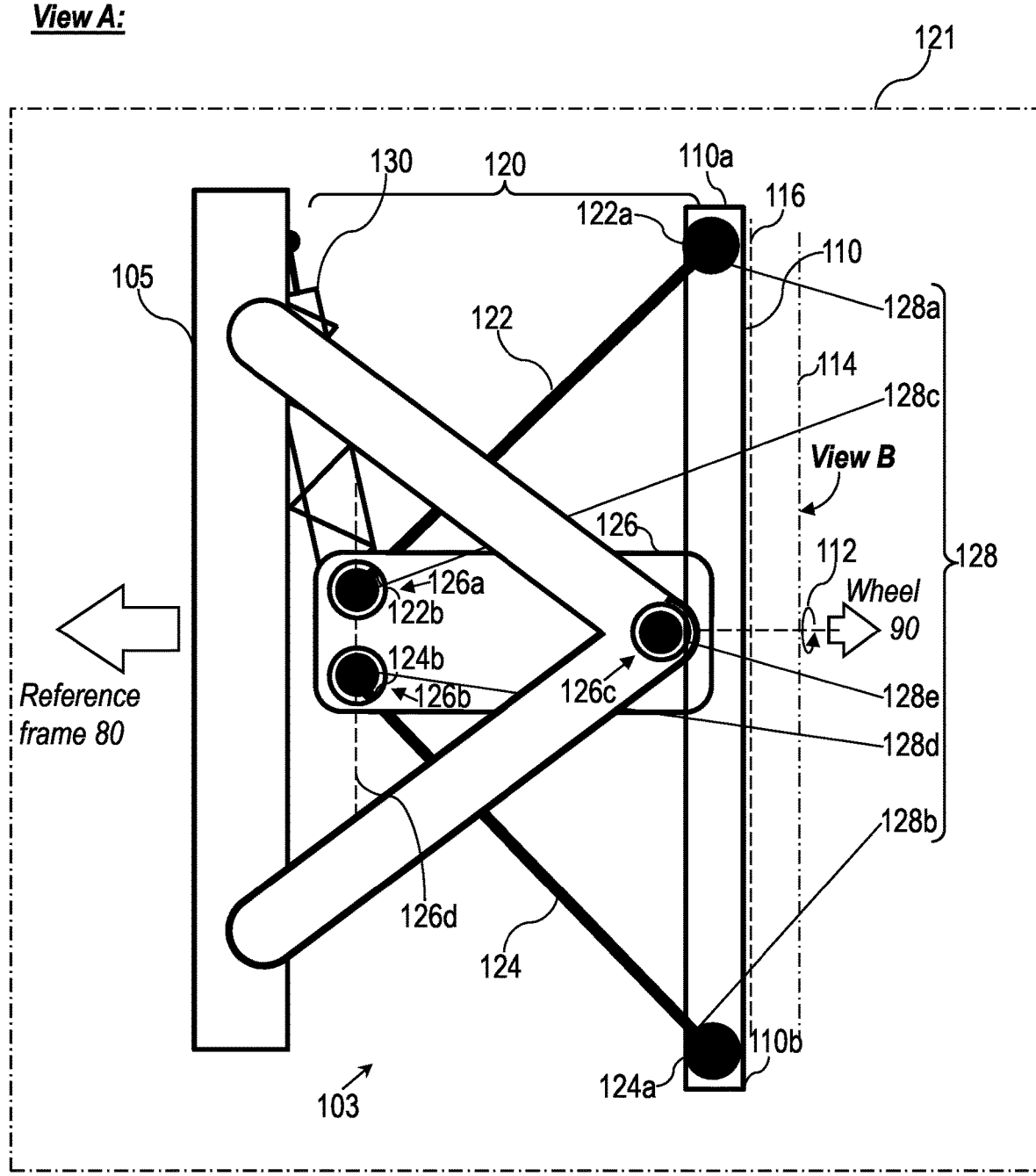
FIGS. 1A and 1B are schematic illustrations of a wheel suspension system, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Current transverse suspension systems (e.g., double wishbone suspension system and/or MacPherson strut suspension system) are typically disposed external to wheels of a vehicle when the wheels are assembled therein. Current transverse suspension systems typically occupy significant space below a reference frame of the vehicle and/or occupy a significant space between the wheel and the reference frame of the vehicle.

Some aspects of the present invention may provide a wheel suspension system. According to some embodiments, the wheel suspension system may include a suspension assembly. In some embodiments, the suspension assembly may include a sub-frame, a wheel interface and one or more linking units.

The sub-frame may be adapted to be connected to a reference frame of the vehicle. The reference frame may be, for example, a chassis of the vehicle.

The wheel interface may be adapted to rotatably support a wheel of the vehicle. The wheel interface may define a wheel rotation axis about which the wheel may rotate and a wheel rotation plane in which the wheel may rotate when the wheel is assembled therein.

Each of the one or more linking units may include a first arm, a second arm and a linking member. In some embodiments, the first arm and the second arm may be pivotally connected at their first ends to the wheel interface and at their second ends to the linking member, and the linking member may be pivotally connected to the sub-frame. In some other embodiments, the first arm and the second arm may be pivotally connected at their first ends to the sub-frame and at their second ends to the linking member, and the linking member may be pivotally connected to the wheel interface.

The pivoting connections of the lining unit(s) may include any connection that may allow pivoting around at least one axis. For example, the pivoting connections may include bearings, bushings, hinges, joints and the like. The pivoting connections may cause rotation of the first arm, the second arm and the linking member of the linking unit(s) about axes that are perpendicular (or substantially perpendicular) to the wheel rotation axis defined by the wheel interface. Component of the linking unit(s) may be dimensioned and the positions of the pivoting connections within the linking unit(s) may be set to enable a linear motion (or substantially linear motion) of the wheel interface along a reference wheel interface motion axis that is perpendicular (or substantially perpendicular) to the wheel rotation axis.

In some embodiments, the first arm, the second arm and the linking member of the linking unit(s) may extend in one or more co-parallel plane that are perpendicular (or substantially perpendicular) to the wheel rotation plane. In some embodiments, the first arm, the second arm and the linking member of the linking unit(s) may be perpendicular (or substantially perpendicular) to the wheel rotation plane.

In some embodiments, the wheel suspension system may include one or more shock absorbers. Each of the one or more shock absorbers may include one or more dampers and one or more springs. Each of the one or more shock absorbers may be pivotally connected at its first end to one the sub-frame or pivotally connectable to the reference frame of the vehicle, and at its second end to one of: the first arm, the second arm and the linking member of the one or more linking units.

In some embodiments, the wheel suspension system may include a steering assembly. The steering assembly may be adapted to steer at least a portion of the suspension assembly. For example, the entire suspension assembly or at least the wheel interface thereof may be steerable.

In some embodiments, the wheel suspension system may include a drivetrain assembly. The drivetrain assembly may include a rotatable drivetrain shaft adapted to transmit rotations generated by a drivetrain motor to the wheel of the vehicle when wheel is assembled therein. In some embodiments, the drivetrain assembly may further include at least one of: a drivetrain motor for generating the rotations and a drivetrain transmission unit for transmitting the rotations from the drivetrain motor to the rotatable drivetrain shaft.

At least a portion of the wheel suspension system may be disposed within a rim of the wheel of the vehicle when the wheel suspension system is assembled therein.

The following illustrations and description depict examples for wheel suspension systems that implement suspension assemblies, steering assemblies and drivetrain assemblies. Each of the wheel suspension systems may be implemented using any embodiment of the suspension assembly, any embodiment of the steering assemblies and any embodiment of the drivetrain assemblies described below according to the specifications of the wheel suspension system, under constraints resulting from manufacturing issues but not from conceptual issues.

Figure 1B:
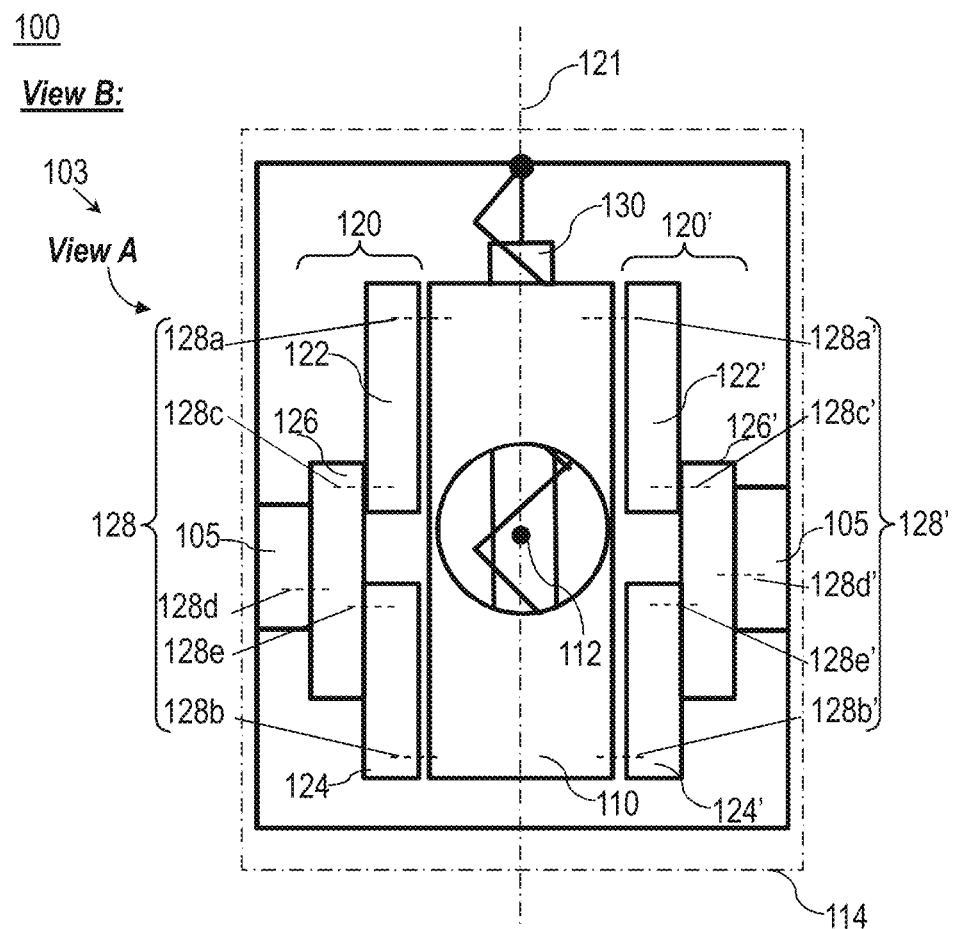

Reference is now made to FIGS. 1A and 1B, which are schematic illustrations of a wheel suspension system 100, according to some embodiments of the invention.

Figure 1C:
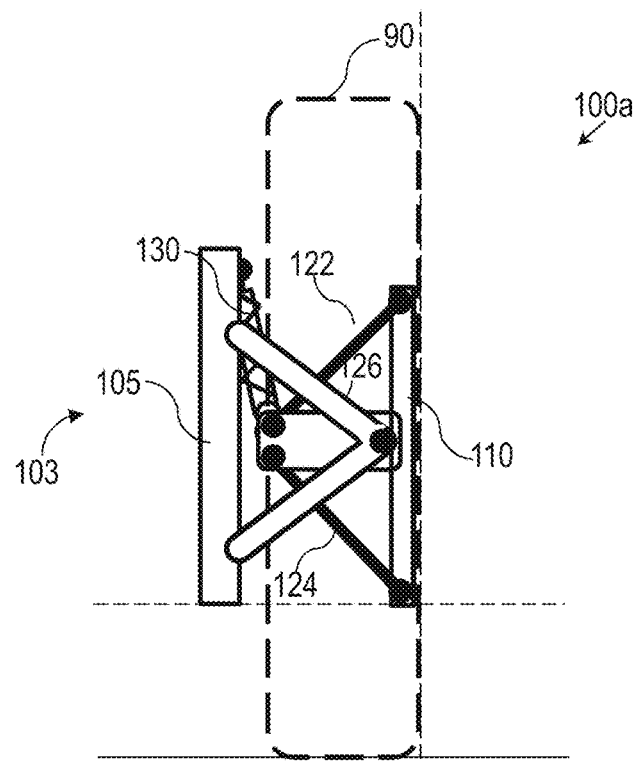
FIG. 1C is a schematic illustration of a wheel suspension system and of a wheel assembled therein, at various positions on a road, according to some embodiments of the invention.
Figure 1C:
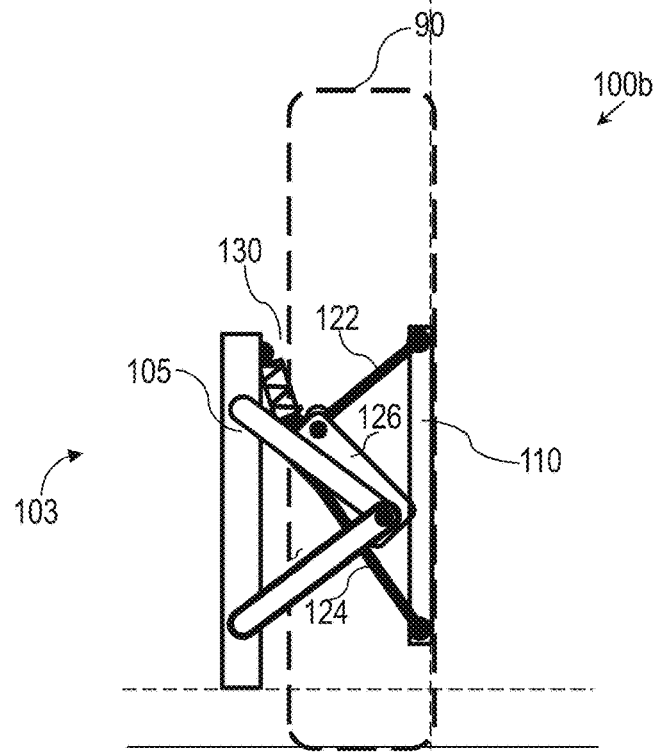

Reference is also made to FIG. 1C, which is a schematic illustration of a wheel suspension system 100 and of a wheel 90 assembled therein, at various positions on a road, according to some embodiments of the invention.

FIGS. 1A and 1C depict a schematic "View A" of wheel suspension system 100 in a plane thereof that is perpendicular (or substantially perpendicular) to a wheel rotation plane. FIG. 1B depicts a schematic View B of wheel suspension system 100, as defined in FIG. 1A.

According to some embodiments, wheel suspension system 100 may include a suspension assembly 103. Suspension assembly 103 may, in some embodiments, include a sub-frame 105, a wheel interface 110, and one or more linking units 120.

Sub-frame 105 may be adapted to be connected to a reference frame 80 of the vehicle. Reference frame 80 may be, for example, a chassis of the vehicle. In some embodiments, sub-frame 105 may be part of reference frame 80 of the vehicle.

Wheel interface 110 may be adapted to rotatably support wheel 90 of the vehicle. Wheel interface 110 may define a wheel rotation axis 112 about which wheel 90 may rotate and a wheel rotation plane 114 in which wheel 90 may rotate (e.g., when wheel 90 is assembled into wheel suspension system 100).

Each of one or more linking units 120 may include a first arm 122, a second arm 124, a linking member 126 and pivoting connections 128. In embodiments shown in FIGS. 1A, 1B and 1C, first arm 122 may be pivotally connected at its first end 122a to a first end 110a of wheel interface 110 using a first pivoting connection 128a and second arm 124 may be pivotally connected at its first end 124a to a second end 110b of wheel interface 110 using a second pivoting connection 128b. First pivoting connection 128a and a second pivoting connection 128b may be positioned at opposite vertical sides of wheel rotation axis 112, such that wheel rotation axis 112 may be positioned between first arm 122 and second arm 124. Linking member 126 may be pivotally connected at a first linking location 126a to a second end 122b of first arm 122 using a third pivoting connection 128c and pivotally connected at a second linking location 126b to a second end 124b of second arm 124 using a fourth pivoting connection 128d Linking member 126 may be pivotally connected at a third linking location 126c to sub-frame 105 using a fifth pivoting connection 128e. In some embodiments, third linking location 126c may be at a predetermined offset from a first reference axis 126d extending between first linking location 126a and second linking location 126b. In some embodiments, the predetermined offset thereof may be towards wheel interface 110.

Pivoting connections 128 may include any connection that may allow pivoting around at least one axis. For example, pivoting connections 128 may cause rotation of first arm 122, second arm 124 and linking member 126 of linking unit(s) 120 about axes that are perpendicular (or substantially perpendicular) to wheel rotation axis 112. First arm 122, second arm 124 and linking member 126 may be dimensioned and positions of pivoting connections 128 within linking unit(s) 120 may be set to enable a linear motion (or substantially linear motion) of wheel interface 110 along a reference wheel interface motion axis 116 that is perpendicular (or substantially perpendicular) to wheel rotation axis 112.

In some embodiments, first arm 122, second arm 124 and linking member 126 may be dimensioned and positions of pivoting connections 128 within linking unit(s) 120 may be set to enable a linear motion (or substantially linear motion) of third linking location 126c that is perpendicular (or substantially perpendicular) to wheel rotation axis 112. In some embodiments, first arm 122, second arm 124 and linking member 126 may be dimensioned and positions of pivoting connections 128 within linking unit(s) 120 may be set to enable a linear motion (or substantially linear motion) of the third linking location 126c with respect to wheel interface 110. In some embodiments, first arm 122, second arm 124 and linking member 126 may be dimensioned and positions of pivoting conenctions128 within linking unit(s)

120 may be set to enable a linear motion (or substantially linear motion) of wheel interface 110 with respect to sub-frame 105.

In some embodiments, first arm 122, second arm 124 and linking member 126 may extend in one or more co-parallel planes 121 that are perpendicular (or substantially perpendicular) to wheel rotation plane 114. In some embodiments, at least one of: first arm 122 and second arm 124 may be perpendicular (or substantially perpendicular) to wheel rotation plane 114.

In embodiments shown in FIGS. 1A, 1B and 1C, suspension assembly 103 may include two parallel linking units 120, 120' disposed at opposite lateral sides of wheel interface 110 with respect to each other, as shown in FIG. 1B Linking unit 120' may be similar to linking unit 120 and may include a first arm 122', a second arm 124', a linking member 126' and pivoting connections 128'.

In some embodiments, wheel suspension system 100 may include one or more shock absorbers 130. For example, in embodiments shown in FIGS. 1A, 1B and 1C, wheel suspension system 100 a single shock absorber 130. Each of one or more shock absorbers 130 may include one or more dampers and one or more springs. Each of one or more shock absorbers 130 may be pivotally connected at its first end to sub-frame 105 or pivotally connectable to reference frame 80 of the vehicle. Each of one or more shock absorbers 130 may be pivotally connected at its second end to one of: first arm 122, second arm 124 and linking member 126 of one or more of linking unit(s) 120 and wheel interface 110. In some other embodiments, one of shock absorber(s) 130 may be pivotally connected at its second end to any other point of wheel suspension system 100. In some embodiments, at least one of one or more shock absorbers 130 may be disposed within a rim of wheel 90 when wheel 90 is assembled into wheel suspension system 100.

At least a portion of wheel suspension system 100 may be disposed within a rim of wheel 90 when wheel suspension system 100 is assembled therein (e.g., as shown in FIG. 1C). In some embodiments, wheel interface 110 and at least a portion of each of first arm 122, second arm 124 and linking member 126 of one or more linking units 120 may be disposed within a rim of wheel 90 when wheel suspension system 100 is assembled therein. In some embodiments, at least wheel interface 110 and linking member 126 of one or more linking units 120 may be disposed within the rim of wheel 90 when wheel suspension system 100 is assembled therein.

Figure 2A:
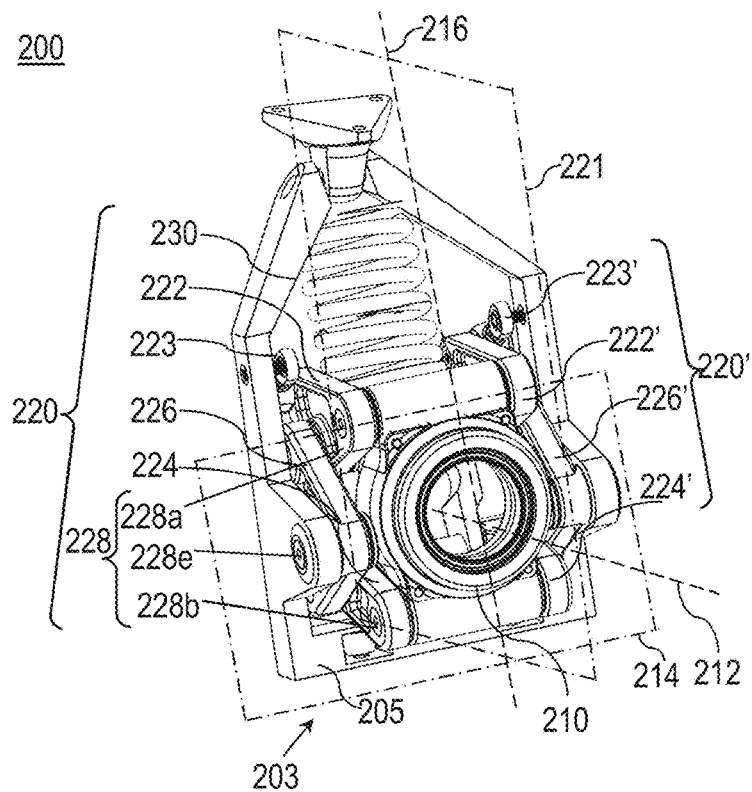
FIGS. 2A, 2B and 2C are schematic illustrations of one embodiment of a wheel suspension system, according to some embodiments of the invention.
Figure 2B:
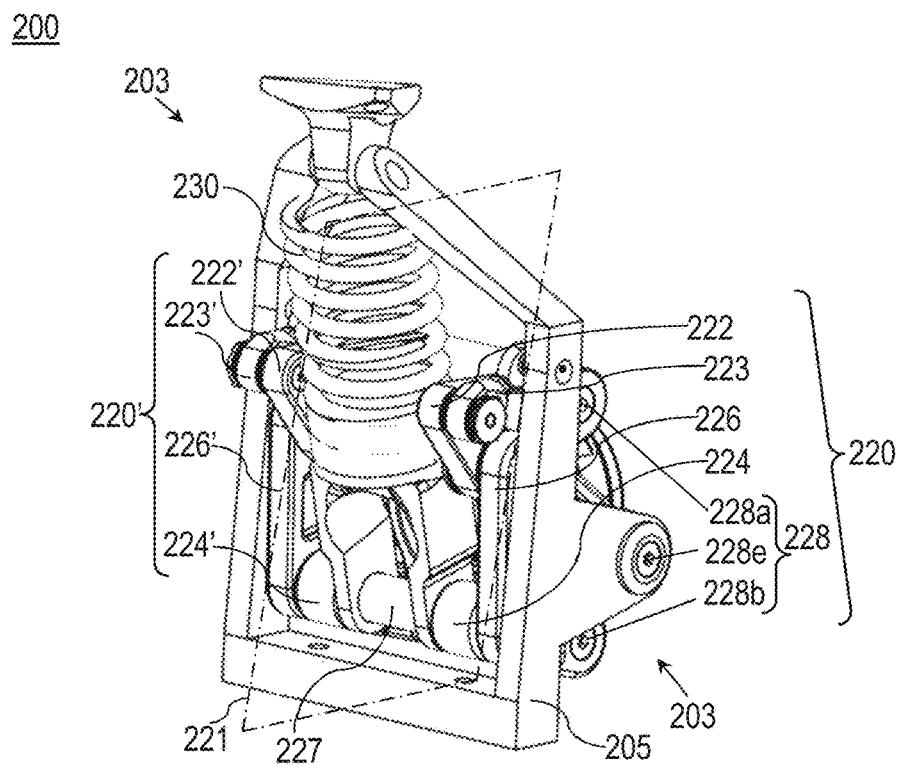
Figure 2C:
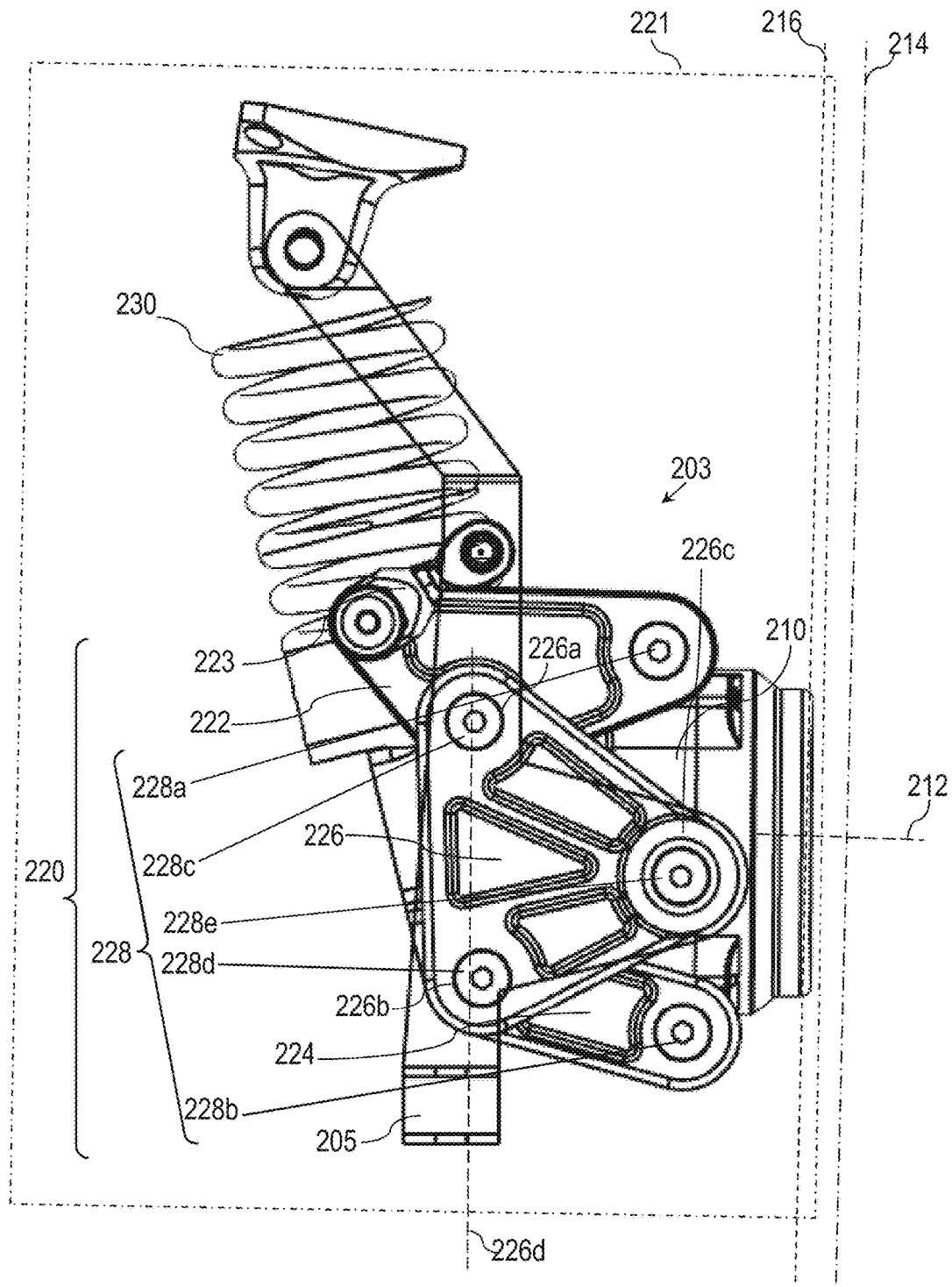

Reference is now made to FIGS. 2A, 2B and 2C, which are schematic illustrations of one embodiment of a wheel suspension system 200, according to some embodiments of the invention.

Figure 2D:
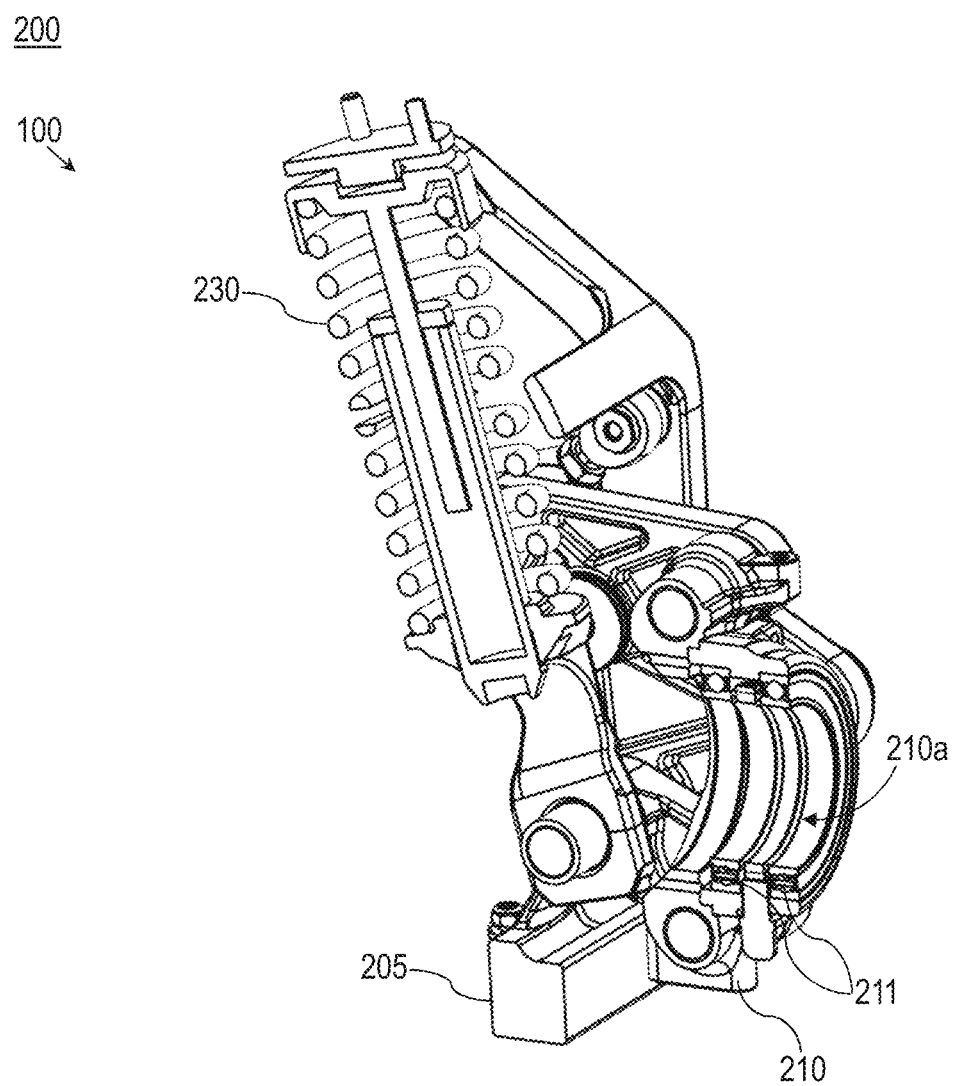
FIG. 2D is a schematic illustration of a transverse cross-section of one embodiment of a wheel suspension system, according to some embodiments of the invention.

Reference is now made to FIG. 2D, which is a schematic illustration of a transverse cross-section of one embodiment of a wheel suspension system 200, according to some embodiments of the invention.

Figure 2E:
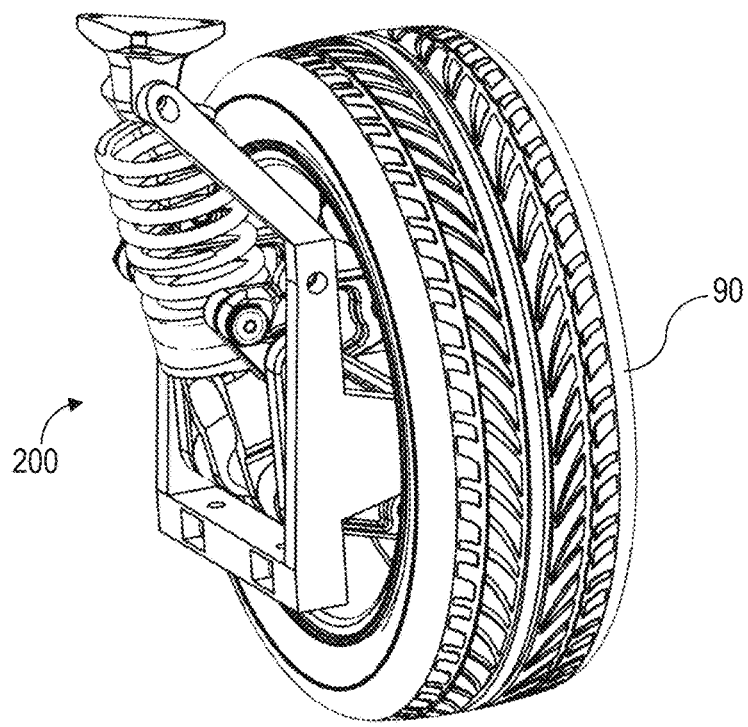
FIGS. 2E and 2F are schematic illustrations of one embodiment of a wheel suspension system and a wheel assembled therein, according to some embodiments of the invention.
Figure 2F:
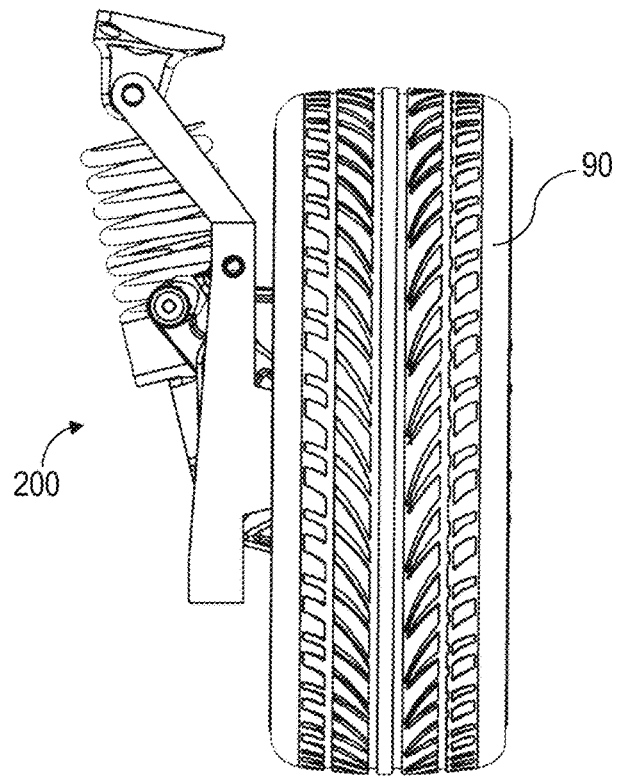

Reference is also made to FIGS. 2E and 2F, which are schematic illustrations of one embodiment of a wheel suspension system 200 and a wheel 90 assembled therein, according to some embodiments of the invention.

FIGS. 2A, 2B and 2D depict different panoramic views of wheel suspension system 200. FIG. 2C depicts a planar view of wheel suspension system 200.

FIGS. 2E and 2F show different views of wheel suspension system 200 and wheel 90 assembled therein.

Wheel suspension system 200 may be similar to wheel suspension system 100 described above with respect to FIGS. 1A, 1B and 1C. According to some embodiments, wheel suspension system 200 may include a suspension assembly 203. In some embodiments, suspension assembly 203 may include a sub-frame 205, a wheel interface 210, one or more linking units 220 and pivoting connections 228. For example, sub-frame 205, wheel interface 210 and one or more linking units 220 may be similar to sub-frame 105, wheel interface 110, one or more linking units 120 and pivoting connections 128, respectively, described above with respect to FIGS. 1A, 1B and 1C.

Wheel interface 210 may define a wheel rotation axis 212 about which wheel 90 may rotate and a wheel rotation plane 214 in which wheel 90 may rotate (e.g., wheel 90 is assembled within when wheel suspension system 200). Wheel rotation axis 212 and wheel rotation plane 214 are not shown in FIG. 2B for sake of clarity.

In some embodiments, wheel interface 210 may include a wheel-interface aperture 210a and one or more wheel-interface bearings 211 (e.g., as shown in FIG. 2D). Wheel-interface aperture 210a may receive a wheel hub of suspension assembly 203. The wheel hub may connect wheel 90 of the vehicle when wheel 90 is assembled into wheel suspension system 200. Wheel-interface bearing(s) 211 may rotatably support the wheel hub and thus wheel 90.

Each of one or more linking units 220 may include a first arm 222, a second arm 224 and a linking member 226. For example, first arm 222, second arm 224 and linking member 226 may be similar to first arm 122, second arm 124 and linking member 126, respectively, as described above with respect to FIGS. 1A, 1B and 1C.

In embodiments shown in FIGS. 2A, 2B and 2C, first arm 222 and second arm 224 of each of one or more linking units 220 may be pivotally connected to wheel interface 210 using a first pivoting connection 228a and a second pivoting connection 228b, respectively, and pivotally connected to linking member 226 at a first linking location 226a and a second linking location 226b using a third pivoting connection 228c and a fourth pivoting connection 228d, respectively. First pivoting connection 228a and a second pivoting connection 228b may be positioned at opposite vertical sides of wheel rotation axis 212, such that wheel rotation axis 212 may be positioned between first arm 222 and second arm 224. Linking member 226 may be pivotally connected to sub-frame 205 at a third linking location 226c using a fifth pivoting connection 228e. In some embodiments, third linking location 126c may be disposed at a predetermined offset from a first reference axis 226d extending between first linking location 226a and second linking location 226b. In some embodiments, the predetermined offset thereof may be towards wheel interface 210. It is noted that sub-frame 205 is made transparent in FIG. 2C for sake of clarity to show first linking location 226a, second linking location 226b, third linking location 226c and first reference axis 226d.

Pivoting connections 228 may include any connection that may allow pivoting around at least one axis. For example, pivoting connections may include bearings, bushings, hinges, joints and the like. Pivoting connections 228 may cause rotation of first arm 222, second arm 224 and linking member 226 of linking unit(s) 220 about axes that are perpendicular (or substantially perpendicular) to wheel rotation axis 212. First arm 222, second arm 224 and linking member 226 may be dimensioned and positions of pivoting connections 228 within linking unit(s) 220 may be set to enable a linear motion (or substantially linear motion) of wheel interface 210 along a reference wheel interface motion axis 216 that is perpendicular (or substantially perpendicular) to wheel rotation axis 212. In some embodiments, first arm 222, second arm 224 and linking member 226 may be dimensioned and positions of pivoting connections 228 within linking unit(s) 220 may be set to enable a linear motion (or substantially linear motion) of third linking location 226c that is perpendicular (or substantially perpendicular) to wheel rotation axis 212. In some embodiments, first arm 222, second arm 224 and linking member 226 may be dimensioned and positions of pivoting connections 228 within linking unit(s) 220 may be set to enable a linear motion (or substantially linear motion) of third linking location 226c with respect to wheel interface 210. In some embodiments, first arm 222, second arm 224 and linking member 226 may be dimensioned and positions of pivoting connections 228 within linking unit(s) 220 may be set to enable a linear motion (or substantially linear motion) of wheel interface 210 with respect to sub-frame 205.

In some embodiments, first arm 222, second arm 224 and linking member 226 may extend in one or more co-parallel planes 221 that are that are perpendicular (or substantially perpendicular) to wheel rotation plane 214 (e.g., as shown in FIGS. 2A, 2B and 2C). In some embodiments, at least one of: first arm 222 and second arm 224 may be perpendicular (or substantially perpendicular) to wheel rotation plane 214 (e.g., as shown in FIGS. 2A, 2B and 2C).

In some embodiments, at least one of: first arm 222 and second arm 224 of one or more linking units 220 may be pivotally connected to sub-frame 205. For example, in embodiments shown in FIGS. 2A, 2B and 2C, first arm 222 of each of linking units 220 is pivotally connected to sub-frame 205 using an arm-subframe link 223. In some embodiments, connection between first arm 222 and second arm 224 of one or more linking units 220 to sub-frame 205 may constrain degrees of freedom of linking units 200 with respect to sub-frame 205.

In some embodiments, first arm 222, second arm 224 and linking member 226 may extend in one or more co-parallel planes 221 that are perpendicular (or substantially perpendicular) to wheel rotation plane 214. In some embodiments, at least one of: first arm 222 and second arm 224 may be perpendicular (or substantially perpendicular) to wheel rotation plane 214.

In embodiments shown in FIGS. 2A, 2B and 2C, suspension assembly 203 may include two parallel linking units 220, 220' disposed at opposite lateral sides of wheel interface 210 with respect to each other Linking unit 220' may be similar to linking unit 220 and may include a first arm 222', a second arm 224', a linking member 226', pivoting connections 228', and optionally an arm-subframe link 223'.

In some embodiments, wheel suspension system 200 may include one or more shock absorbers 230. Shock absorber(s) 230 may be similar to shock absorber(s) 130 described above with respect to FIGS. 1A, 1B and 1C. Each of one or more shock absorbers 230 may be pivotally connected at its first end to sub-frame 205 or pivotally connectable to reference frame 80 of the vehicle. Each of one or more shock absorbers 230 may be pivotally connected at its second end to one of: first arm 222, second arm 224 and linking member 226 of one or more of linking unit(s) 220 and wheel interface 210. For example, in embodiments shown in FIGS. 2A, 2B and 2C, wheel suspension system 200 includes a single shock absorber 230 that is pivotally connected at its first end to sub-frame 205 and pivotally connected at its second end to a pivot 227 extending between second linking locations 226b of linking members 226 of linking units 220 (e.g., as shown in FIG. 2B).

At least a portion of wheel suspension system 200 may be disposed within a rim of wheel 90 when wheel 90 is assembled within wheel suspension system 200 (e.g., as shown in FIGS. 2E and 2F).

Figure 3A:
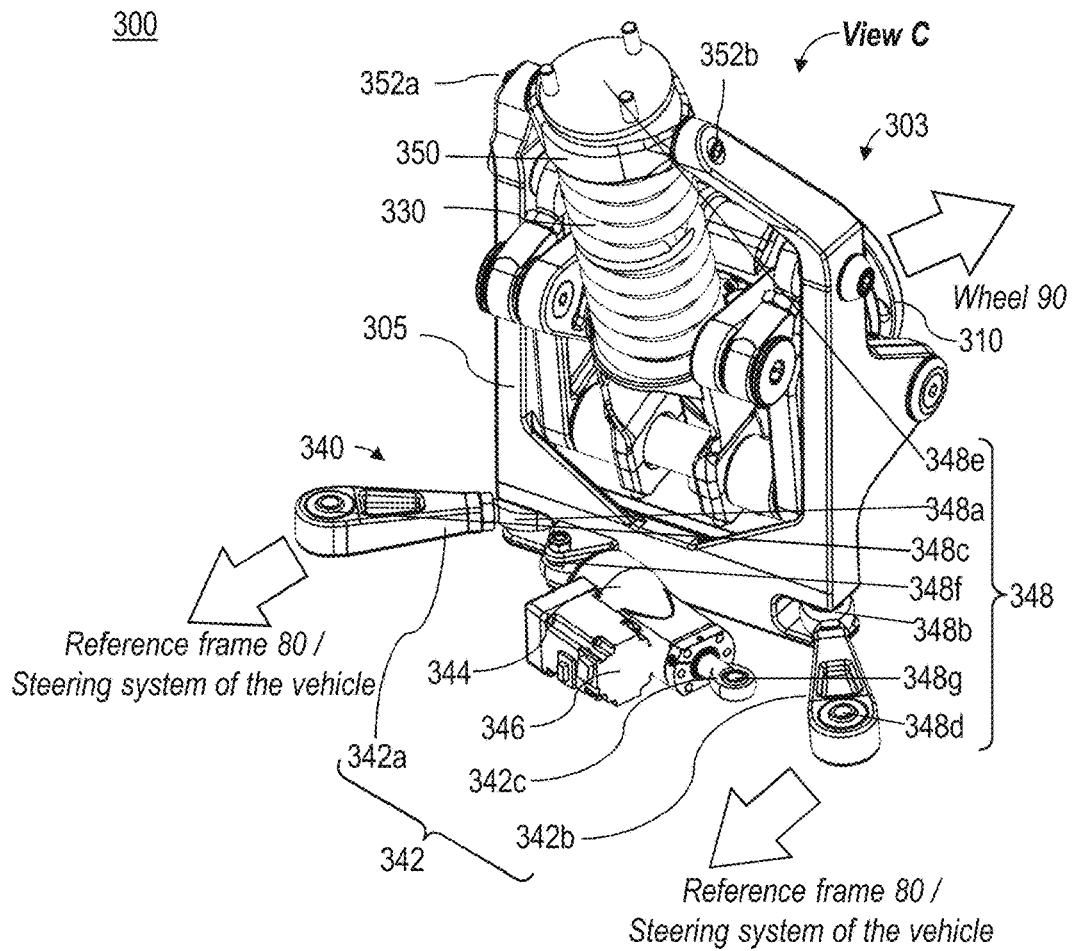
FIGS. 3A and 3B are schematic illustration of one embodiment of a wheel suspension system including a steering assembly, according to some embodiments of the invention.
Figure 3B:
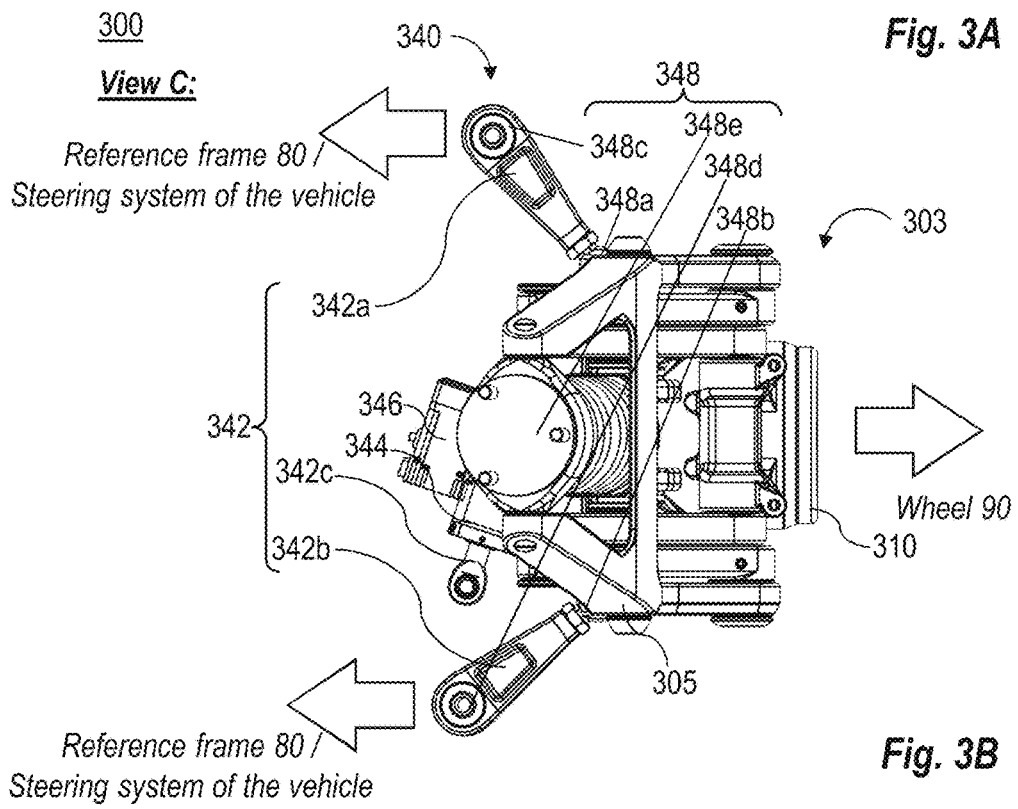

Reference is now made to FIGS. 3A and 3B, which are schematic illustration of one embodiment of a wheel suspension system 300 including a steering assembly 340, according to some embodiments of the invention.

FIG. 3A depicts a perspective view of wheel suspension system 300 and FIG. 3B depicts a schematic "View C" of wheel suspension system 300 as defined in FIG. 3A.

According to some embodiments, wheel suspension system 300 may include a suspension assembly 303 and a steering assembly 340. Suspension assembly 303 may be similar to, for example, suspension assembly 203/603 as described elsewhere herein.

In some embodiments, steering assembly 340 may include one or more steering arms 342 and steerable pivoting connections 348. In embodiments shown in FIGS. 3A and 3B, steering assembly 340 may include a first steering arm 342a and a second steering arm 342b pivotally connected at their first ends to sub-frame 305 using a first steerable pivoting connection 348a and a second steerable pivoting connection 348b, respectively. Sub-frame 305 may be similar to, for example, sub-frame 205/605 described elsewhere herein. Steering arm(s) 342 may be pivotally connectable to reference frame 80 or interfaceable at their second ends with a steering system of the vehicle using a third steerable pivoting connection 348c and a fourth steerable pivoting connection 348d, respectively. For example, steering arm(s) 342 may be interfaceable with a steering actuator located at the vehicle, steering controller, steer-by-wire system, etc.

In some embodiments, first steering arm 342a, second steering arm 342b and sub-frame 305 may form a general trapezoid shape. The trapezoidal shape thereof may, for example, enable absorption of lateral loads applied on wheel suspension system 300 by wheel 90 when wheel 90 is assembled within wheel assembly 300.

In embodiments shown in FIGS. 3A and 3B, a fifth steerable pivoting connection 348e may pivotally connect sub-frame 305 and/or a shock absorber 330 of wheel suspension system 300 to reference frame 80 of the vehicle. Shock absorber 330 may be similar to, for example, shock absorber(s) 230/630 described elsewhere herein.

In some embodiments, fifth steerable pivoting connection 348e may define the axis of rotation of suspension assembly 303 with respect to reference frame 80. In some embodiments, the axis of rotation may define the kingpin axis (e.g., steering axis) inclination. Fifth steerable pivoting connection 348e may take vertical loads and some lateral loads applied on wheel suspension system 300. In some embodiments, fifth steerable pivoting connection 348e acts as a strut interface between suspension system 300 and reference frame 80.

Actuation of steering assembly 340 may be by one of: electrical, hydraulic, or pneumatic actuators. In some embodiments, steering assembly 340 includes at least one of: a steering transmission unit 344 and a steering motor 346 (e.g., as shown in FIG. 3B). In embodiments shown in FIGS. 3A and 3B, steering transmission unit 344 may be pivotally connected to sub-frame 305 using a sixth steerable pivoting connection 348f. Sixth steerable pivoting connection 348f may be, for example, disposed between first steerable pivoting connection 348a and second steerable pivoting connection 348b. Optionally, steering assembly 340 may include a third steering arm 342c connected to steering transmission unit 344 and pivotally connectable to reference frame 80 or interfaceable with the steering system of the vehicle using a seventh steerable pivoting connection 348g.

In embodiments shown in FIGS. 3A and 3B, steering assembly 340 may change a steering angle of the entire suspension assembly 303 (e.g., including the sub-frame, wheel interface, one or more linking units and or more shock absorbers).

In embodiments of FIGS. 3A and 3B, steering assembly 340 may be externally connectable to suspension assembly 303 without a need in changing a structure and/or dimensions of the suspension assembly 303. In this manner, steering assembly 340 that is externally connectable to suspension assembly 303 does not restrict (or substantially does not restrict) the linear movement of suspension assembly 303 in the transverse plane of wheel suspension system 300. Further, steering assembly 340 that is connectable to suspension assembly 303 does not increase the number of moving components to suspension assembly 303, which eliminates a need in increasing the number of pivoting connections in suspension assembly 303 and the number of degrees of freedom.

In some other embodiments, at least a portion of suspension assembly 303 may be steerable. For example, wheel suspension system 300 may include a steering assembly capable of steering a wheel interface 310 of suspension assembly 303 (e.g., such as steering unit 740 described below with respect to FIG. 7).

In some embodiments, one or more of steering transmission unit 344 and a steering motor 346 are electrically connected to a steering controller. In some embodiments, steering controller may be disposed at the wheel suspension system 300. In some embodiments, steering controller may be disposed at the vehicle.

In operation, loads applied on wheel are transferred via the chain of suspension arms and the linkage member of suspension assembly 303 to shock absorber 330. When the ratio between the travel of the wheel and the compression/extension length of the shock absorber is higher than 1, the potential load within shock absorber 330 may be higher than having ratio lower than 1. A ratio higher than 1 may be due to having a short levers mechanism (e.g. by having short levers of linkage arms and linkage member when compared to longer levers at typical suspension systems).

Typically, for a given wheel travel and a given wheel rate (calculated based on wheel travel and spring rate), shortening the spring will require higher spring rate. Otherwise loads applied by the spring on its supporting frame may increase, or system becomes stiffer. In some example embodiments of the invention, as shown for example in suspension assemblies 103/203/303/403/503 described elsewhere herein, the shock absorber is compact and sized to fit between the wheel interface and the vehicle frame. In some example embodiments of the invention as shown for example in FIGS. 1C, 2F, and 5C, the shock absorber is compact and sized to extend between the wheel rotation axis and the external diameter of the wheel, when the wheel is at 0 travel.

According to some embodiments, suspension system 300 includes a strut support ring 350, interconnecting shock absorber 330 from a bottom side of strut support ring 350 and fifth steerable pivoting connection 348e from a top side of strut support ring 350. In some embodiments, strut support ring 350 is connected to sub-frame 305. In some embodiments, strut support ring 350 is connected to sub-frame 305 by two ring pivots 352a/352b. Two ring pivots 352a/352b take the residual loads applied by shock absorber 330 and thereby reduce the load applied by suspension system 303 on fifth steerable pivoting connection 348e. This may allow having a reduced length shock absorber 330, while suspension system 303 accommodates loads applied on system 300 as described above. In some embodiments, support ring 350 may decouple suspension system 303 and steering assembly 340, such that a majority the vertical reaction loads are absorbed by suspension system 303 and not transferred to fifth steerable pivoting connection 348e. Such decoupling may reduce the torque required for steering of wheel 90 and/or reduce the loads required to be taken by bearings assembled in steering assembly 340.

Figure 4A:
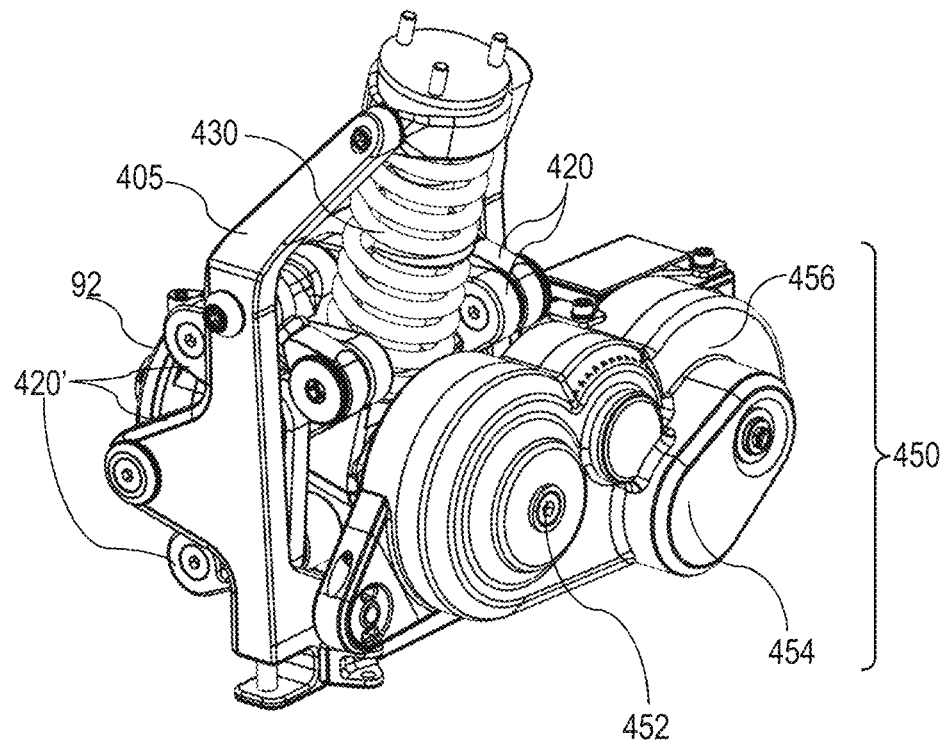
FIGS. 4A, 4B and 4C are schematic illustrations of one embodiment of a wheel suspension system including a drivetrain assembly, according to some embodiments of the invention.
Figure 4B:
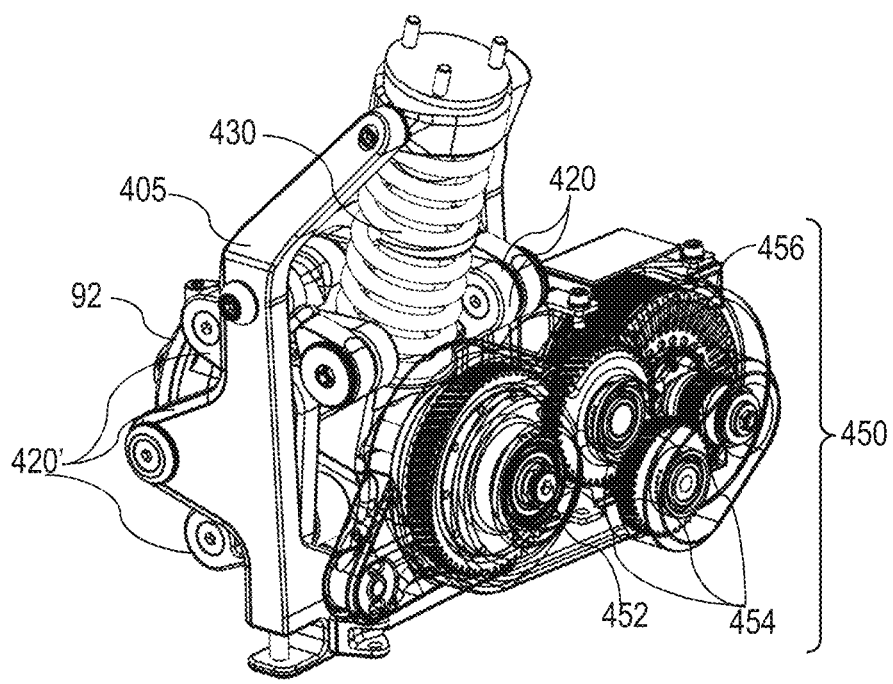
Figure 4C:
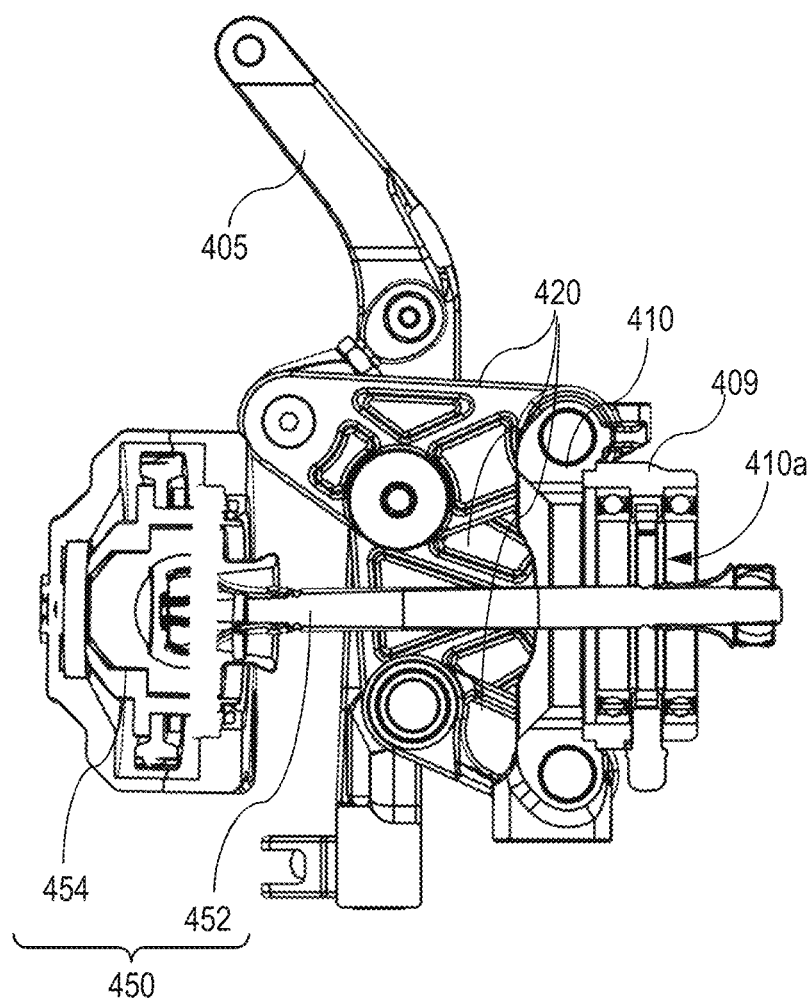

Reference is now made to FIGS. 4A, 4B and 4C, which are schematic illustrations of one embodiment of a wheel suspension system 400 including a drivetrain assembly 450, according to some embodiments of the invention.

According to some embodiments, wheel suspension system 400 may include a suspension assembly 403 and a drivetrain assembly 450. Suspension assembly 403 may be similar to, for example, suspension assembly 203/603 (e.g., as described elsewhere herein).

FIGS. 4A and 4B depict a schematic perspective view of wheel suspension system 400. FIG. 4C shows a schematic transverse cross-sectional view of wheel suspension system 400. FIGS. 4A and 4B depict also a shock absorber 430.

In some embodiments, drivetrain assembly 450 may include at least a rotatable drivetrain shaft 452 (e.g., as shown in FIG. 4C). Rotatable drivetrain shaft 452 may be adapted to be connected to a wheel hub 409. In some embodiments, rotatable driving shaft 452 may extend from a drivetrain motor towards a wheel interface 410. Rotatable drivetrain shaft 452 may pass between linking units 420 of suspension assembly 403 of wheel suspension system 400 and through an aperture 410a of wheel interface 410 (e.g., as shown in FIG. 4C). Wheel interface 410 and linking units 420 may be similar to, for example, wheel interface 210 and linking units 220, respectively, as described above with respect to FIGS. 2A, 2B and 2C. In some embodiments, the motor may be not a part of drivetrain assembly 450.

In some embodiments, rotatable drivetrain shaft 452 may be connected to wheel hub 409 using a constant-velocity joint. In some embodiments, the constant-velocity joint may be positioned external to wheel hub 409 and at a larger distance from reference frame 80 than wheel hub 409. In this manner, the vertical movement of wheel interface 410 of suspension assembly 403 may be increased. This may be due to, for example, reduction of an angle of the movement of the constant-velocity joint with respect to wheel hub 409.

In some other embodiments, drivetrain assembly 450 may include a drivetrain motor 456. Drivetrain motor 456 may be adapted to rotate rotatable drivetrain shaft 452. In some embodiments, drivetrain motor 456 may be disposed within wheel interface 410 of suspension assembly 403. In some embodiments, drivetrain motor 456 may be disposed between linking units 420 of suspension assembly 403. In some embodiments, drivetrain motor 456 may be disposed external to suspension drivetrain 403 in an opposite direction from wheel interface 410 thereof (e.g., as shown in FIGS. 4A, 4B and 4C). For example, drivetrain motor 456 may be connected to a sub-frame 405 of suspension assembly 403 (e.g., as shown in FIGS. 4A, 4B and 4C). Sub-frame 405 may be similar to sub-frame 205 as described above with respect to FIGS. 2A, 2B and 2C.

In some embodiments, drivetrain assembly 450 may include a drivetrain transmission unit 454 (e.g., as shown in FIGS. 4A, 4B and 4C). Drivetrain transmission unit 454 may connect drivetrain motor(s) 456 and rotatable drivetrain shaft 452, and transmit rotations generated by drivetrain motor(s) 456 to rotatable drivetrain shaft 452. In some embodiments, drivetrain transmission unit 454 may be connected to sub-frame 405 (e.g., as shown in FIGS. 4A, 4B and 4C). Drivetrain transmission unit 454 may, for example, include one or more gears (e.g., as shown in FIG. 4B). In some embodiments, drivetrain transmission unit 454 may include one or more transmission belts.

In some embodiments, drivetrain assembly 450 may be disposed between reference frame 80 of the vehicle and sub-frame 405 of wheel suspension system 400, when wheel suspension system 400 is assembled into reference frame 80.

In some embodiments, drivetrain assembly 450 may be electrically connected to a drivetrain controller. In some embodiments, the drivetrain controller may be disposed within wheel suspension system 400. In some embodiments, the drivetrain controller may be disposed within train assembly 450. In some embodiments, the drivetrain controller may be disposed at the vehicle.

Figure 5A:
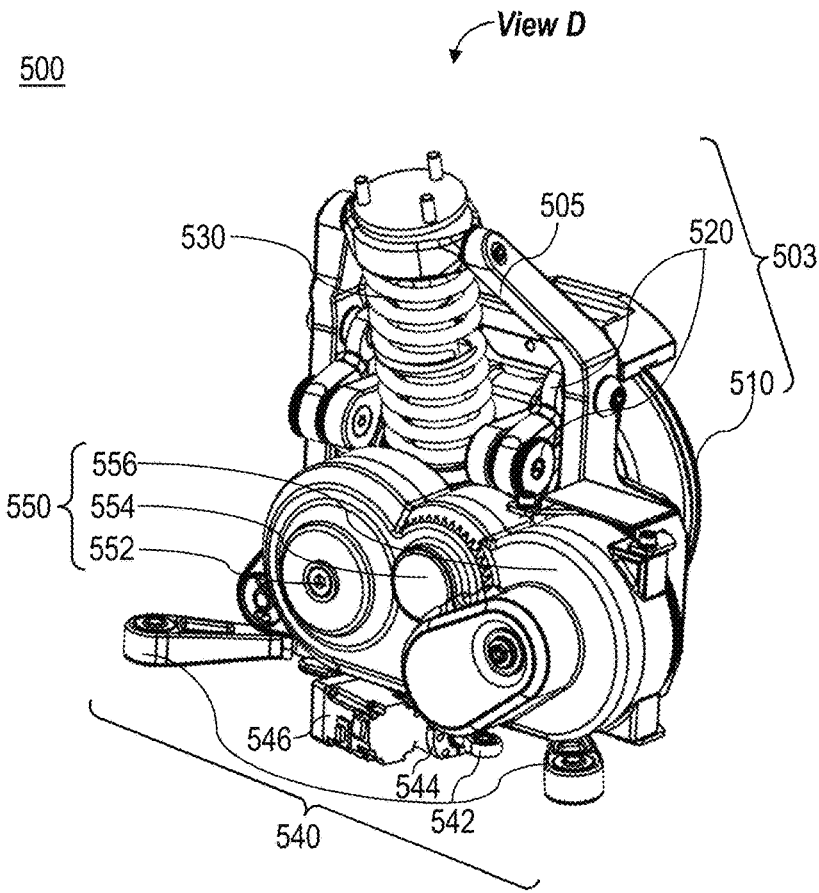
FIGS. 5A and 5B are schematic illustrations of one embodiment of a wheel suspension system including a suspension assembly, a steering assembly and a drivetrain assembly, according to some embodiments of the invention.
Figure 5B:
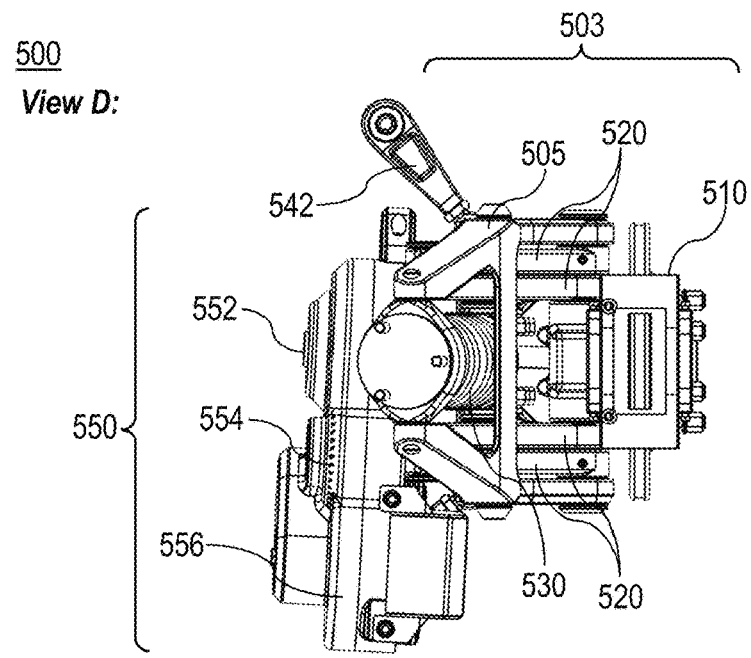

Reference is now made to FIGS. 5A and 5B, which are schematic illustrations of one embodiment of a wheel suspension system 500 including a suspension assembly 503, a steering assembly 540 and a drivetrain assembly 550, according to some embodiments of the invention.

Figure 5C:
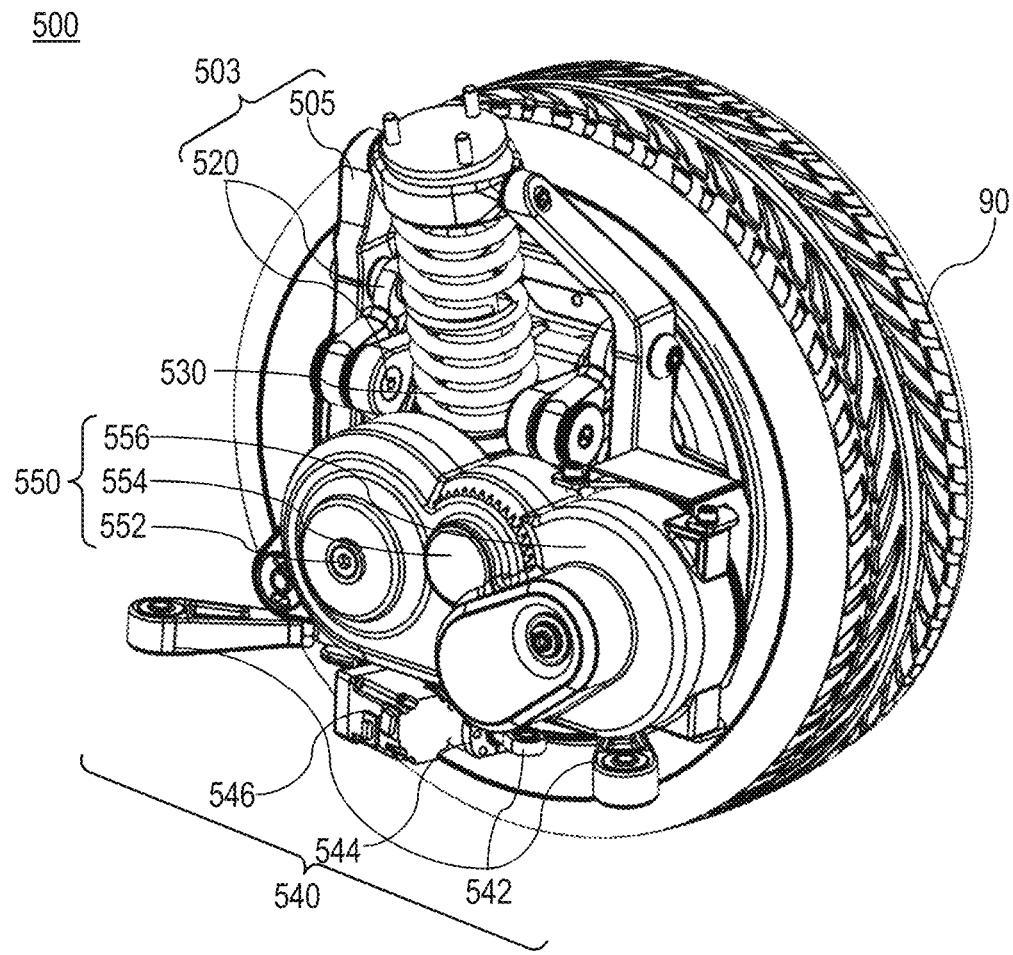
FIG. 5C is a schematic illustration of one embodiment of a wheel suspension system including a suspension assembly, a steering assembly and a drivetrain assembly, and of a wheel assembled therein, according to some embodiments of the invention.

Reference is also made to FIG. 5C, which is a schematic illustration of one embodiment wheel suspension system 500 including a suspension assembly 503, a steering assembly 540 and a drivetrain assembly 550, and of a wheel 90 assembled therein, according to some embodiments of the invention.

FIGS. 5A and 5C depict a perspective view of wheel suspension system 500. FIG. 5B depicts a schematic "View D" of wheel suspension system 500 as defined in FIG. 5A.

According to some embodiments, wheel suspension system 500 may include a suspension assembly 503, one or more shock absorbers 530, a steering assembly 540 and a drivetrain assembly 550.

Wheel suspension assembly 503 may be similar to, for example, suspension assembly 203/603 as described elsewhere herein. In some embodiments, suspension assembly 503 may include a wheel interface 510, one or more linking units 520. For example, wheel interface 510, one or more linking units 520, may be similar to wheel interface 210/610, one or more linking units 220/620, respectively, described elsewhere herein.

One or more shock absorbers 530 may be similar to, for example, one or more shock absorbers 230/630 described elsewhere herein.

Steering assembly 540 may be similar to steering assembly 340 described above with respect to FIGS. 3A and 3B. In some embodiments, steering assembly 540 may include one or more steering arms 542, a steering transmission unit 544 and a steering motor 546. For example, one or more steering arms 542, steering transmission unit 544 and steering motor 546 may be similar to one or more steering arms 342, steering transmission unit 344 and steering motor 346, respectively, as described above with respect to FIGS. 3A and 3B.

Drivetrain assembly 550 may be similar to, for example, drivetrain assembly 450 described above with respect to FIGS. 4A, 4B and 4C. In some embodiments, drivetrain assembly 550 may include a rotatable drivetrain shaft 552, a drivetrain transmission unit 554 and a drivetrain motor 556. For example, rotatable drivetrain shaft 552, drivetrain transmission unit 554 and drivetrain motor 556 may be similar to rotatable drivetrain shaft 452, drivetrain transmission unit 454 and drivetrain motor 456, respectively, described above with respect to FIGS. 4A, 4B and 4C.

Figure 6A:
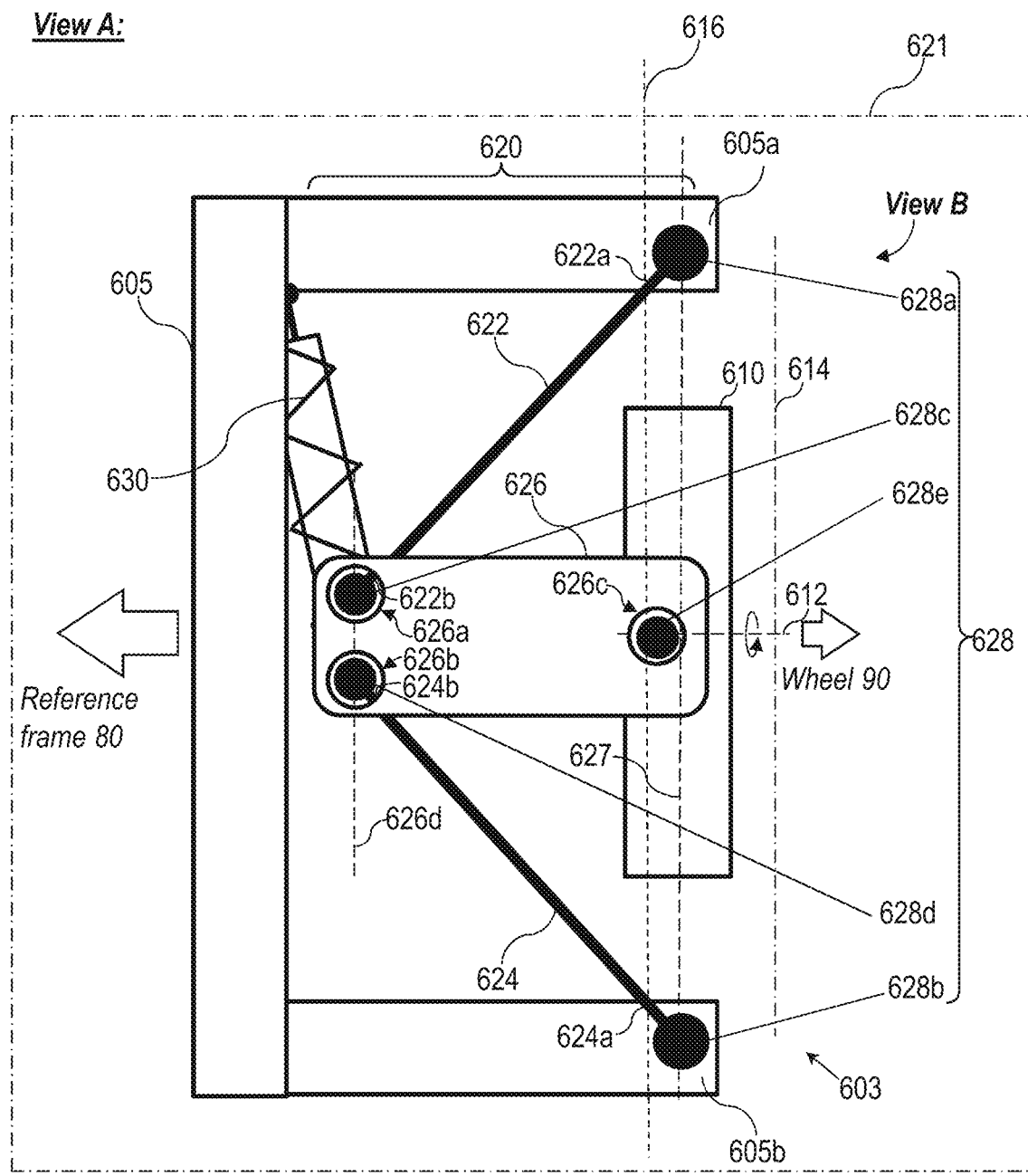
FIGS. 6A and 6B are schematic illustrations of an alternative configuration of a wheel suspension system, according to some embodiments of the invention.
Figure 6B:
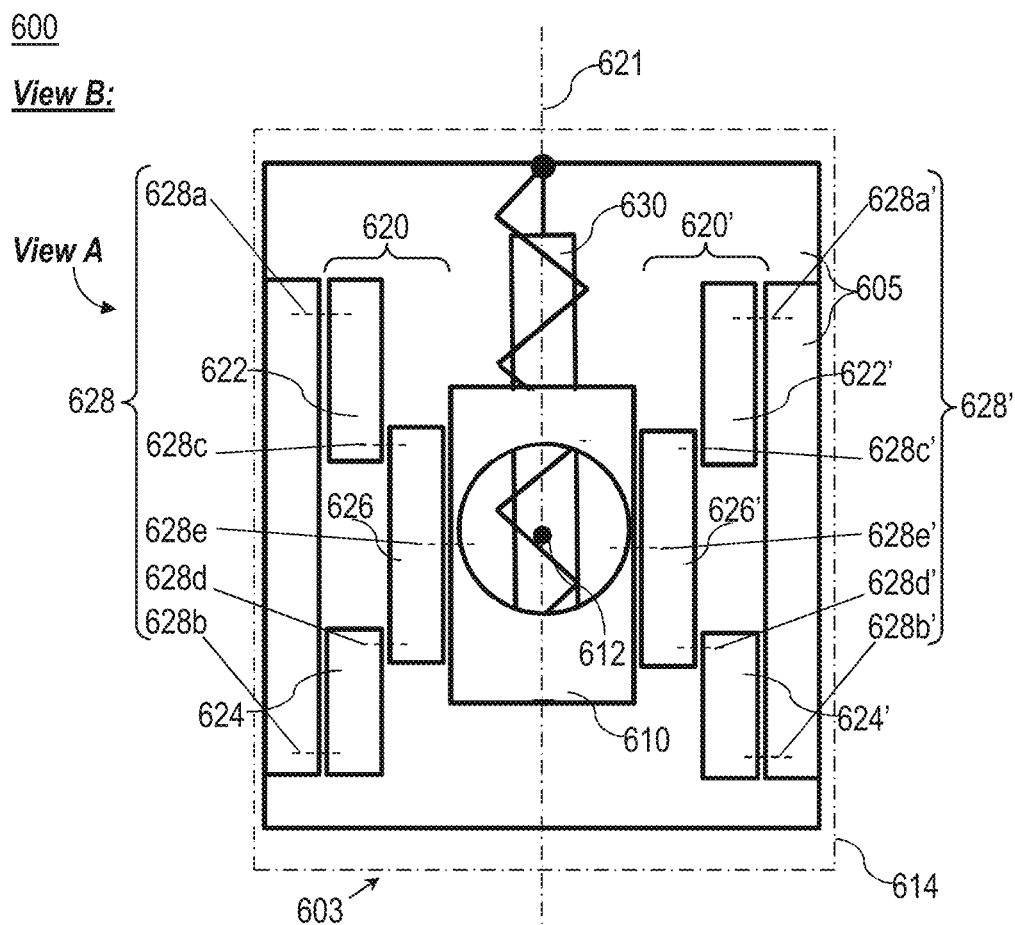

Reference is now made to FIGS. 6A and 6B, which are schematic illustrations of an alternative configuration of a wheel suspension system 600, according to some embodiments of the invention.

Figure 6C:
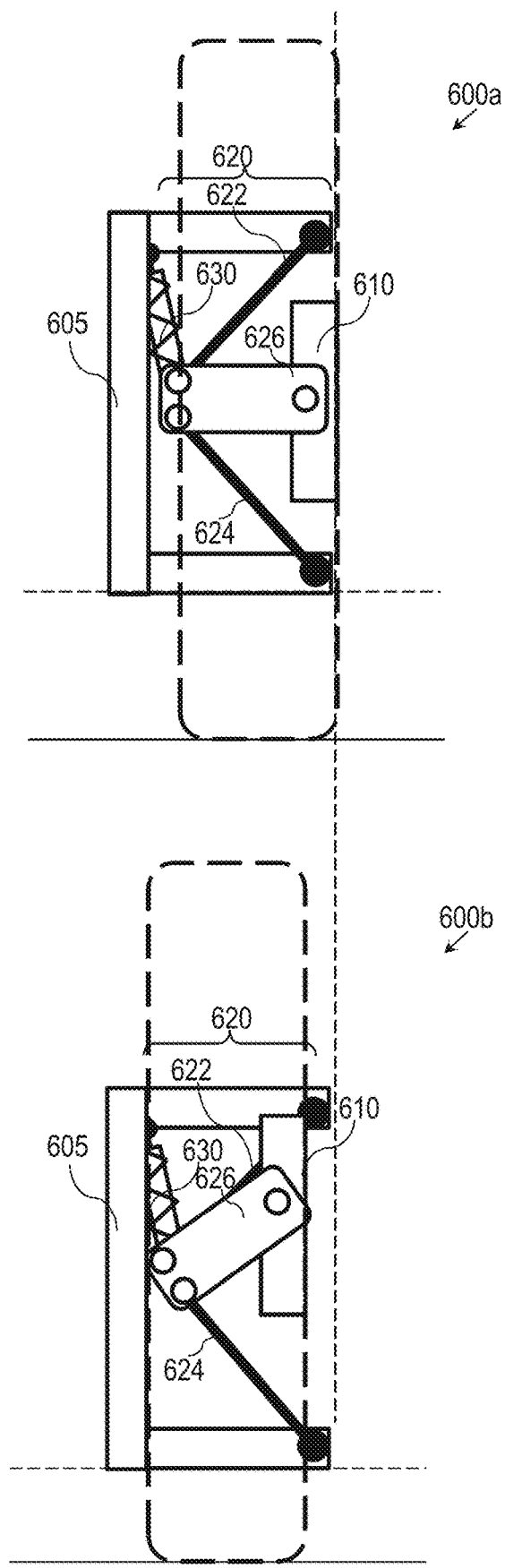
FIG. 6C is a schematic illustration of an alternative configuration of a wheel suspension system and of a wheel assembled therein, at various positions on a road, according to some embodiments of the invention.

Reference is also made to FIG. 6C, which is a schematic illustration of an alternative configuration of a wheel suspension system 600 and of a wheel assembled therein, at various positions on a road, according to some embodiments of the invention.

FIGS. 6A and 6C depict a schematic "View A" of wheel suspension system 600 in a transverse plane thereof that to a wheel rotation plane. FIG. 6B depicts a schematic View B of wheel suspension system 600, as defined in FIG. 6A.

According to some embodiments, wheel suspension system 600 may include a suspension assembly 603. Suspension assembly 603 may, in some embodiments, include a sub-frame 605, a wheel interface 610 and one or more linking units 620. For example, sub-frame 605, wheel interface 610 and one or more linking units 620 may be similar to sub-frame 105 and wheel interface 110, respectively, described above with respect to FIGS. 1A, 1B and 1C.

Wheel interface 610 may be adapted to rotatably support wheel 90 of the vehicle. Wheel interface 610 may define a wheel rotation axis 612 about which wheel 90 may rotate and a wheel rotation plane 614 in which wheel 90 may rotate (e.g., when wheel 90 is assembled to wheel suspension system).

Each of one or more linking units 620 may include a first arm 622, a second arm 624, a linking member 626 and pivoting connections 628. For example, first arm 622, second arm 624 and linking member 626 may be similar to first arm 122, second arm 124 and linking member 126, respectively, described above with respect to FIGS. 1A, 1B and 1C.

In embodiments shown in FIGS. 6A, 6B and 6C, first arm 622 may be pivotally connected at its first end 622*a* to a first end 605*a* of sub-frame 605 using a first pivoting connection 628*a*, and second arm 624 may be pivotally connected at its first end 624*a* to a second end 605*b* of sub-frame 605 using a second pivoting connection 628. Linking member 626 may be pivotally connected at a first linking location 626*a* to a second end 622b of first arm 622 using a third pivoting connection 628*c* and pivotally connected at a second linking location 626*b* to a second end 624*b* of second arm 624 using a fourth pivoting connection 628*d*. Linking unit 626 may be pivotally connected at a third linking location 626*c* to wheel interrace 610 using a fifth pivoting connection 628*e*. First pivoting connection 628*a* and a second pivoting connection 628b may be positioned at opposite vertical sides of wheel rotation axis 612, such that wheel rotation axis 612 may be positioned between first arm 622 and second arm 624.

In some embodiments, third linking location 626*c* may be disposed at a predetermined first offset from a first reference axis 626*d* extending between first linking location 626*a* and second linking location 626*b*. In some embodiments, the predetermined first offset thereof may be towards wheel interface 610.

In some embodiments, a second reference axis 627 extending between first end 622*a* of first arm 622 and first end 624*a* of second arm 624 may be disposed at a predetermined second offset from first reference axis 626*d*. In some embodiments, the predetermined second offset may be towards wheel interface 610.

Pivoting connections 628 may include any connection that may allow pivoting around at least one axis. For example, pivoting connections 628 may include bearings, bushings, hinges, joints and the like. Pivoting connections 628 may cause rotation of first arm 622, second arm 624 and linking member 626 of linking unit(s) 620 about axes that are perpendicular (or substantially perpendicular) to wheel rotation axis 612. First arm 622, second arm 624 and linking member 626 may be dimensioned and positions of pivoting connections 628 within linking unit(s) 620 may be set to enable a linear motion (or substantially linear motion) of wheel interface 610 along a reference wheel interface motion axis 616 that is perpendicular (or substantially perpendicular) to wheel rotation axis 612.

In some embodiments, first arm 622, second arm 624 and linking member 626 may be dimensioned and positions of pivoting connections 628 within linking unit(s) 620 may be set to enable a linear motion (or substantially linear motion) of third linking location 626c that is perpendicular (or substantially perpendicular) to wheel rotation axis 612. In some embodiments, first arm 622, second arm 624 and linking member 626 may be dimensioned and positions of pivoting connections 628 within linking unit(s) 620 may be set to enable a linear motion (or substantially linear motion) of third linking location 626c with respect to sub-frame 605. In some embodiments, first arm 622, second arm 624 and linking member 626 may be dimensioned and positions of pivoting connections 628 within linking unit(s) 620 may be set to enable a linear motion (or substantially linear motion) of wheel interface 610 with respect to sub-frame 605.

In some embodiments, first arm 622, second arm 624 and linking member 626 may extend in one or more co-parallel planes 621 that are perpendicular (or substantially perpendicular) to wheel rotation plane 614. In some embodiments, at least one of: first arm 622 and second arm 624 may be perpendicular (or substantially perpendicular) to wheel rotation plane 614.

In embodiments shown in FIGS. 6A, 6B and 6C, suspension assembly 603 may include two co-parallel linking units 620, 620' disposed at opposite lateral sides of wheel interface 610 with respect to each other, as shown in FIG. 6B Linking unit 620' may be similar to linking unit 620 and may include a first arm 622', a second arm 624', a linking member 626' and pivoting connections 628'.

In some embodiments, wheel suspension system 600 may include one or more shock absorbers 630. For example, in embodiments shown in FIGS. 6A, 6B and 6C, wheel suspension system 600 a single shock absorber 630. Each of one or more shock absorbers 630 may include one or more dampers and one or more springs. Each of one or more shock absorbers 630 may be pivotally connected at its first end to sub-frame 605 or pivotally connectable to reference frame 80 of the vehicle. Each of one or more shock absorbers 630 may be pivotally connected at its second end to one of: first arm 622, second arm 624 and linking member 626 of one or more of linking unit(s) 620 and wheel interface 610. In some other embodiments, one of shock absorber(s) 630 may be pivotally connected at its second end to any other point of wheel suspension system 600. In some embodiments, at least one of one or more shock absorbers 630 may be disposed within a rim of wheel 90 when wheel 90 is assembled into wheel suspension system 600.

At least a portion of wheel suspension system 600 may be disposed within a rim of wheel 90 when wheel suspension system 600 is assembled therein (e.g., as shown in FIG. 6C). In some embodiments, wheel interface 610 and at least a portion of each of first arm 622, second arm 624 and linking member 626 of one or more linking units 620 may be disposed within a rim of wheel 90 when wheel suspension system 600 is assembled therein. In some embodiments, at least wheel interface 610 and linking member 626 of one or more linking units 620 may be disposed within the rim of wheel 90 when wheel suspension system 600 is assembled therein.

Figure 7:
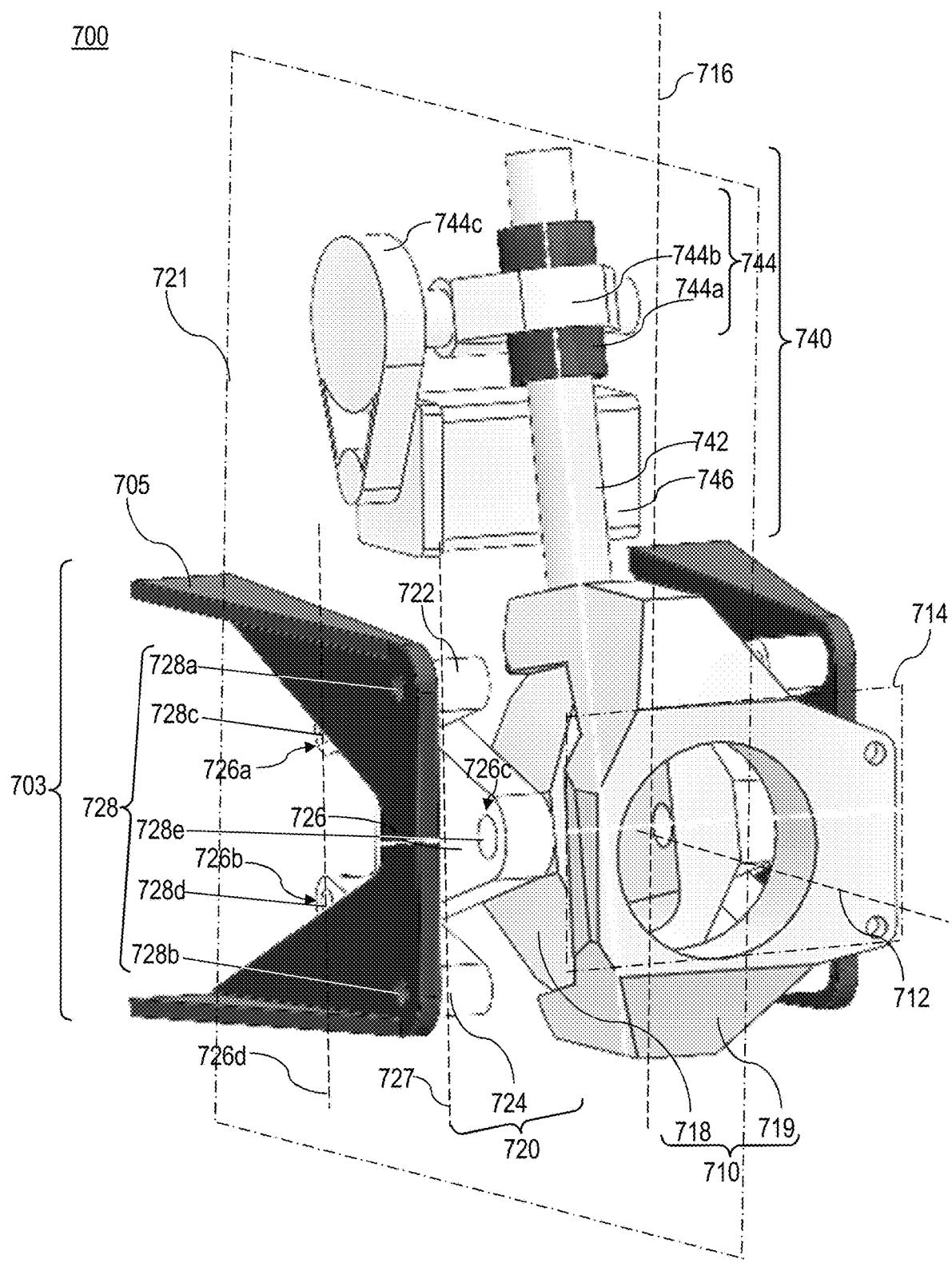
FIG. 7 is a schematic illustration of one embodiment of an alternative configuration of a wheel suspension system including a steering assembly, according to some embodiments of the invention.

Reference is now made to FIG. 7, which is a schematic illustration of one embodiment of an alternative configuration of a wheel suspension system 700 including a steering assembly 740, according to some embodiments of the invention.

Wheel suspension system 700 may be similar to, for example, wheel suspension systems 600 and 200 described above. According to some embodiments, wheel suspension system 700 may include a suspension assembly 703. In some embodiments, suspension assembly 703 may include a sub-frame 705, a wheel interface 710 and one or more linking units 720. For example, sub-frame 705, wheel interface 710 and one or more linking units 720 may be similar to sub-frame 205/605, wheel interface 210/610 and one or more linking units 220/620 described above.

In some embodiments, wheel suspension system 700 may include one or more shock absorbers, e.g., like shock absorber(s) 230/630 described above. The shock absorber(s) are not shown in FIG. 7 for sake of clarity only.

Wheel interface 710 may define a wheel rotation axis 712 about which wheel 90 may rotate and a wheel rotation plane 714 in which wheel 90 may rotate (e.g., when wheel suspension system 700 is assembled therein).

In embodiments shown in FIG. 7, first arm 722 and second arm 724 of each of one or more linking units 720 may be pivotally connected to wheel interface 710 using a first pivoting connection 728a and a second pivoting connection 728b, respectively, and pivotally connected to linking member 726 at a first linking location 726a and a second linking location 726b using a third pivoting connection 728c and a fourth pivoting connection 728d, respectively Linking member 726 may be pivotally connected to sub-frame 705 at a third linking location 726c using a fifth pivoting connection 728e. First pivoting connection 728a and a second pivoting connection 728b may be positioned at opposite vertical sides of wheel rotation axis 712, such that wheel rotation axis 712 may be positioned between first arm 722 and second arm 724.

Pivoting connections 728 may include any connection that may allow pivoting around at least one axis. For example, pivoting connections 728 may include bearings, bushings, hinges, joints and the like. Pivoting connections 728 may cause rotation of first arm 722, second arm 724 and linking member 726 of linking unit(s) 720 about axes that are perpendicular (or substantially perpendicular) to the wheel rotation axis. First arm 722, second arm 724 and linking member 726 may be dimensioned and positions of pivoting connections 728 within linking unit(s) 720 may be set to enable a linear motion (or substantially linear motion) of wheel interface 710 along a reference wheel interface motion axis 716 that is perpendicular (or substantially perpendicular) to wheel rotation axis 712.

In some embodiments, third linking location 726c may be disposed at a predetermined offset from a first reference axis 726d extending between first linking location 726a and second linking location 726b. In some embodiments, the predetermined offset thereof may be towards wheel interface 710.

In some embodiments, a second reference axis 727 extending between connections points of first arm 722 and second arm 724 to linking member 726 may be disposed at a predetermined second offset from first reference axis 726d.

In some embodiments, the predetermined second offset may be towards wheel interface 710.

In some embodiments, first arm 722, second arm 724 and linking member 726 may extend in one or more co-parallel planes that are perpendicular (or substantially perpendicular) to wheel rotation plane 714. In some embodiments, at least one of: first arm 722 and second arm 724 may be perpendicular (or substantially perpendicular) to wheel rotation plane 714.

In embodiments shown in FIG. 7, suspension assembly 703 may include two co-parallel linking units 720, 720' disposed at opposite lateral sides of wheel interface 710 with respect to each other. Linking unit 720' is not identified by reference numerals in FIG. 7 for sake of clarity only, but it may be similar to lining unit 620' described above with respect to FIG. 6B.

In some embodiments, wheel interface 710 may be steerable. For example, wheel interface 710 may be operated to change its steering angle. In embodiments shown in FIG. 7, wheel interface 710 may include a wheel interface coupler 718 and a wheel support member 719. Wheel interface coupler 718 may be pivotally connected at its lateral sides to linking member 726 of one or more linking units 720 at third linking location 726c thereof to enable a linear motion (or substantially linear motion) of wheel interface coupler 718 along reference wheel interface motion axis 716.

In embodiments shown in FIG. 7, wheel support member 710 may be pivotally connected at one or more of its ends to one or more ends of wheel interface coupler 718 using one or more steerable pivoting connections. Wheel support member 719 may rotatably support wheel 90 when wheel 90 is assembled therein. The steerable pivoting connections may enable to change a steering angle of wheel support member 719, while the pivoting connections of wheel interface coupler 718 to linking member(s) 726 of linking unit(s) 720 may enable a linear motion (or substantially linear motion) of wheel interface coupler 718 and of wheel support member 719 along reference wheel interface motion axis 716.

In some embodiments, wheel suspension system 700 may include a steering assembly 740. In some embodiments, steering assembly 740 may include a steering rod 742. Steering rod 742 may be connected to wheel support member 719 of wheel interface 710. Steering rod 742 may define a steering axis of wheel support member 719 of wheel interface 710. In some embodiments, steering rod 742 may be operated by a conversional steering system of the vehicle, steer-by-wire system etc., to change the steering angle of wheel support member 719 of wheel interface 710.

In some other embodiments, steering assembly 740 may include a steering transmission 744 and a steering motor 746. Steering transmission 744 may transmit rotations of steering motor 746 to steering rod 742 to steer wheel interface 710.

In embodiments shown in FIG. 7, steering transmission 744 may be coupled to steering rod 742 by a sleeve 744a slidable on steering rod 742. Sleeve 744a may, for example, include torque (e.g., linear torque) resisting member. In embodiments shown in FIG. 7, steering transmission 744 may include a gear 744b. Gear 744b may, for example, include a worm gear. In embodiments shown in FIG. 7, gear 744b may be coupled to steering motor 746 using a belt 744c. It is noted that other configurations of steering transmission 744 are also possible.

Connection of wheel support member 719 to steering assembly 740 using wheel interface coupler 718 may enable steering of wheel interface 710 without restricting (or substantially without restricting) the linear movement of suspension assembly 703 in the transverse plane of wheel suspension system 700.

In some embodiments, wheel suspension system 700 may include a steering assembly capable of steering the entire suspension assembly 703 (e.g., such as steering assembly 340 described above with respect to FIGS. 3A and 3B).

Figure 8:
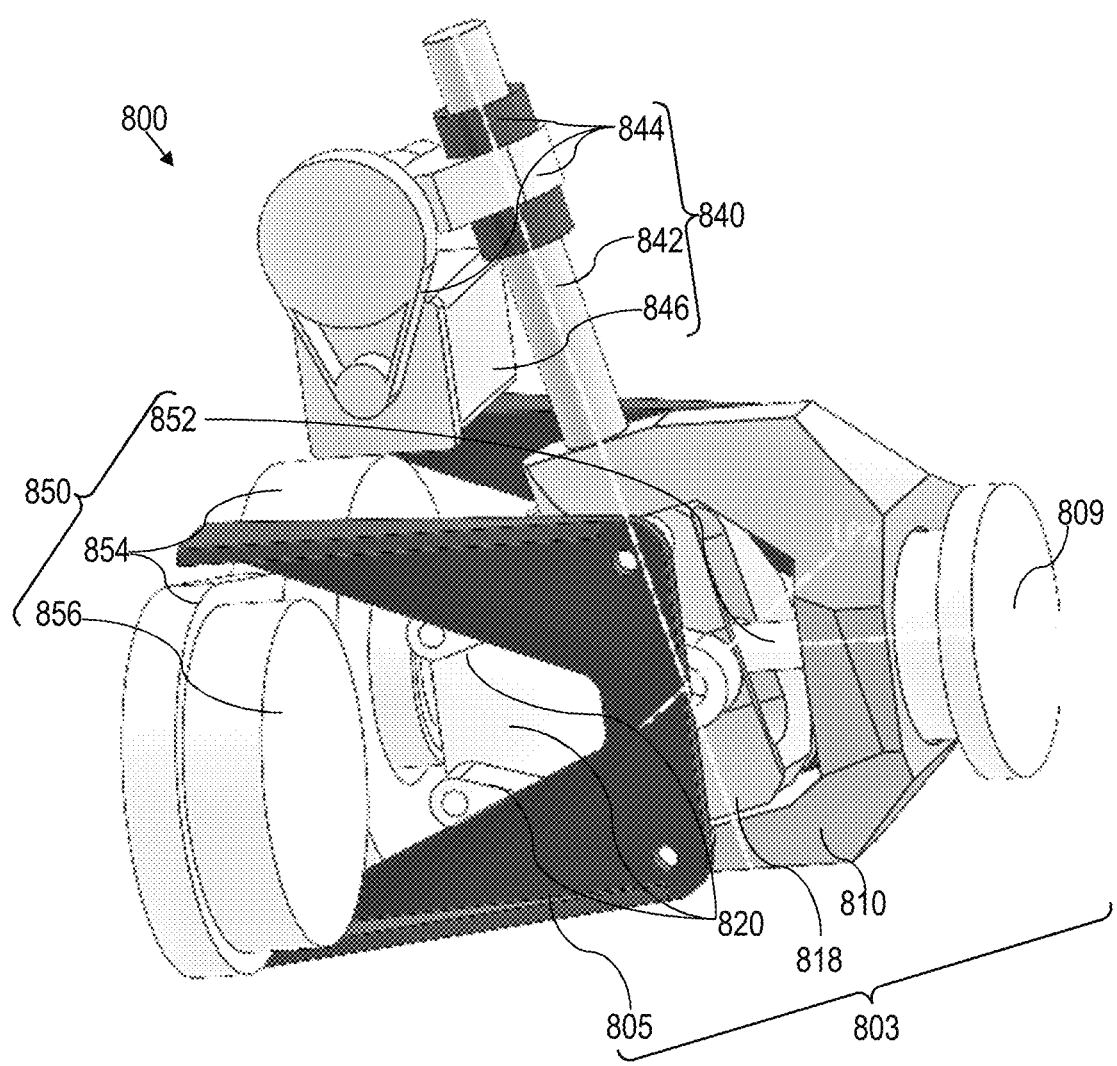
FIG. 8 is a schematic illustration of one embodiment of an alternative configuration of a wheel suspension system including a suspension assembly, a steering assembly and a drivetrain assembly, according to some embodiments of the invention.

Reference is now made to FIG. 8, which is a schematic illustration of one embodiment of an alternative configuration of a wheel suspension system 800 including a suspension assembly 803, a steering assembly 840 and a motorizing unit 850, according to some embodiments of the invention.

According to some embodiments, wheel suspension system 800 may include a suspension assembly 803, a steering assembly 840 and a driving unit 850.

Suspension assembly 803 may be similar to, for example, suspension assembly 703 as described above with respect to FIG. 7, or suspension assembly 603 described above with respect to FIGS. 6A, 6B and 6C. For example, suspension assembly 803 may include a sub-frame 805, a wheel interface 810, a wheel interface coupler 818 and one or more linking units 820. Sub-frame 805, wheel interface 810, wheel interface coupler 818, one or more linking units 820 may be similar to sub-frame 705, wheel interface 710, wheel interface coupler 718, one or more linking units 720 described above with respect to FIG. 7.

Steering assembly 840 may be similar to steering assembly 740 described above with respect to FIG. 7. In some embodiments, steering assembly 840 may include a steering rod 842, a steering transmission 844 and a steering motor 846. For example, steering rod 842, steering transmission 844 and steering motor 846 may be similar to steering rod 742, steering transmission 744 and steering motor 746 described above with respect to FIG. 7.

Drivetrain assembly 850 may be similar to, for example, drivetrain assembly 450 described above with respect to FIGS. 4A, 4B and 4C. In some embodiments, drivetrain assembly 850 may include a rotatable drivetrain shaft 852. Rotatable drivetrain shaft 852 may be adapted to be connected to a wheel hub 809 of suspension assembly 803 of the vehicle and adapted to be connected to a drivetrain motor when wheel 90 is assembled into wheel suspension system 800. In some embodiments, rotatable drivetrain shaft 852 may extend from the drivetrain motor towards a wheel interface 810 and pass between linking units 820 of suspension assembly 803 (e.g., as shown in FIG. 8).

In some other embodiments, drivetrain assembly 850 may include a drivetrain motor 856. Drivetrain motor 856 may be adapted to rotate rotatable drivetrain shaft 852. In some embodiments, drivetrain motor 856 may be disposed within wheel interface 810 of suspension assembly 803. In some embodiments, drivetrain motor 856 may be disposed between linking units 820 of suspension assembly 803. In some embodiments, drivetrain motor 856 may be disposed external to suspension assembly 803 in an opposite direction from wheel interface 810 thereof (e.g., as shown in FIG. 8). For example, drivetrain motor 856 may be connected to sub-frame 805 of suspension assembly 803.

In some embodiments, drivetrain assembly 850 may include a drivetrain transmission unit 854 (e.g., as shown in FIG. 8). Drivetrain transmission unit 854 may connect drivetrain motor 856 and rotatable drivetrain shaft 852, and transmit rotations generated by drivetrain motor 852 to rotatable drivetrain shaft 852. In some embodiments, drivetrain transmission unit 854 may be connected to sub-frame 805. Drivetrain transmission unit 854 may, for example, include one or more gears.

It is noted that various combinations of wheel suspension system 800 are possible. For example, wheel suspension system 800 may include suspension assembly 803 and drivetrain assembly 850 only, without steering assembly 840.

Figure 9:
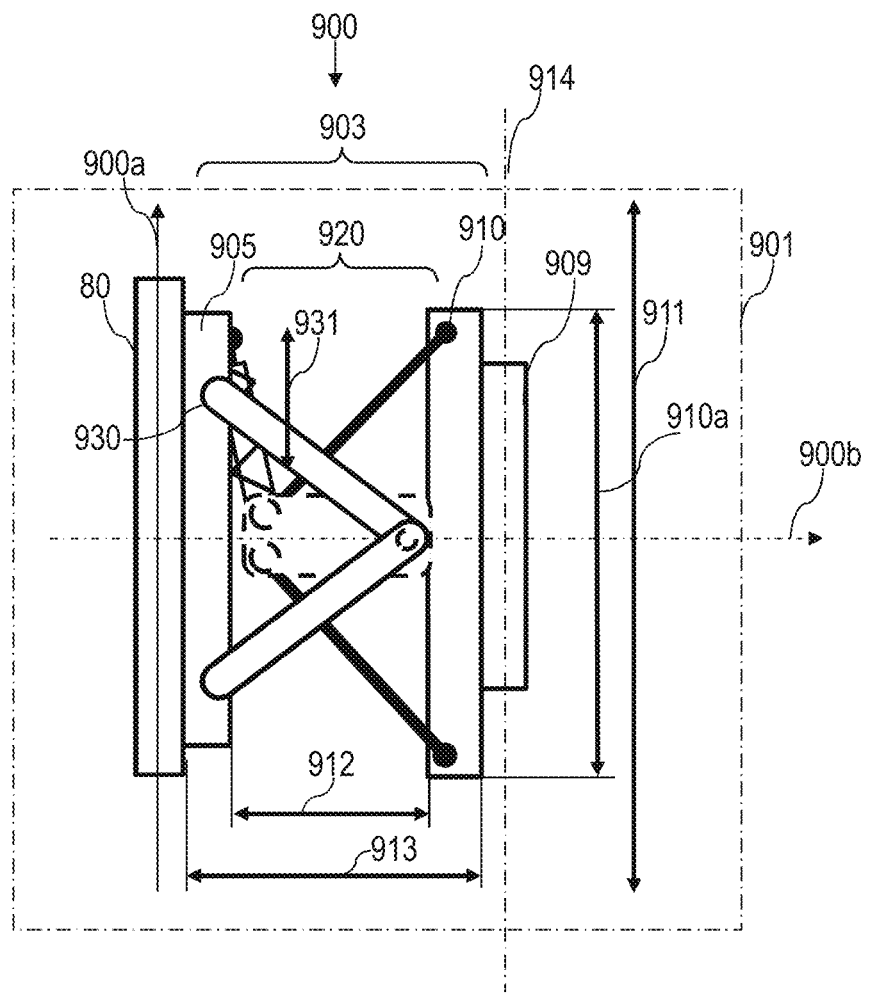
FIG. 9 is schematic illustration of a wheel suspension system and a reference frame of a vehicle, enhanced with some structural parameters thereof, according to some embodiments of the invention.

Reference is now made to FIG. 9, which is schematic illustration of a wheel suspension system 900 and a reference frame 80 of a vehicle, enhanced with some structural parameters thereof, according to some embodiments of the invention.

wheel suspension system 900 may be similar to wheel suspension system 100 described above with respect to FIGS. 1A, 1B and 1C (e.g., as shown in FIG. 9) or may be similar to wheel suspension system 600 described above with respect to FIGS. 6A, 6B and 6C.

FIG. 9 depicts wheel suspension system 900 in a transverse plane 901 thereof that is perpendicular (or substantially perpendicular) to a wheel rotation plane 914 in which wheel of the vehicle may rotate when wheel 90 is assembled into wheel suspension system 900.

In some embodiments, wheel suspension system 900 may include a suspension assembly 903. Suspension assembly 903 may include a sub-frame 905, a wheel interface 910, a wheel hub 909, one or more linking units 920. In some embodiments, wheel suspension system 900 may include one or more shock absorbers 930. For example, sub-frame 905, wheel interface 910, one or more linking units 920 and one or more shock absorbers 930 may be similar to sub-frame 105, wheel interface 110, one or more linking units 120 and one or more shock absorbers 130 described above with respect to FIGS. 1A, 1B and 1C or to sub-frame 605, wheel interface 610, one or more linking units 620 and one or more shock absorbers 630 described above with respect to FIGS. 6A, 6B and 6C.

FIG. 9 depicts some structural parameters of wheel suspension system 900 as described below.

A range of substantially vertical linear motion of wheel interface 910 in the plane that is parallel to transverse plane 901 and substantially along a reference vertical axis 900a of wheel suspension system 900 is schematically indicated in FIG. 9 by doubled arrow 911. Reference vertical axis 900a may be parallel (or substantially parallel) to a vertical axis of the vehicle when wheel suspension system 900 is assembled therein.

A range of substantially vertical linear motion of shock absorber 930 in the plane that is parallel to transverse plane 901 and substantially along reference vertical axis 900a is schematically indicated in FIG. 9 by doubled arrow 931.

A distance between sub-frame 905 and wheel interface 910 along a reference transverse axis 900b of wheel suspension system 900 is schematically indicated in FIG. 9 by doubled arrow 912. Reference transverse axis 900b extends in transverse plane 901 and perpendicular to wheel rotation plane 914.

A distance between reference frame 80 and a wheel hub 909 (e.g., connected to wheel interface 910) along a reference transverse axis 900b of wheel suspension system 900 is schematically indicated in FIG. 9 by doubled arrow 913.

A vertical length of wheel interface substantially along reference vertical axis 900a is schematically indicated in FIG. 9 by doubled arrow 910a.

The components of suspension assembly 903 may be dimensioned and the positions and orientations of the pivoting connections between the components thereof may be determined to enable a linear motion (or substantially linear motion) of wheel interface 910 in the plane that is parallel to transverse plane 901 of wheel suspension system 900 and in a substantially vertical direction (e.g., in vertical axis 900b) with respect to reference frame 80 of the vehicle when wheel suspension system 100 is assembled therein.

In some embodiments, a maximal distance 912 between sub-frame 905 and wheel interface 910 during substantially vertical linear movement 911 of wheel interface 910 may be smaller a maximal substantially vertical linear movement 911 of wheel interface 910. For example, a maximal distance 912 between sub-frame 905 and wheel interface 910 during substantially vertical linear movement 911 of wheel interface 910 may be smaller than 70% (e.g., smaller than 70%, 30%, etc.) of a maximal substantially vertical linear movement 911 of wheel interface 910.

In some embodiments, a minimal distance 913 between reference frame 80 and wheel hub 909 during substantially vertical linear movement 911 of wheel interface 910 may be smaller than a maximal substantially vertical linear movement 911 of wheel interface 910. For example, a minimal distance 913 between reference frame 80 and wheel hub 909 during substantially vertical linear movement 911 of wheel interface 910 may be smaller than 80% (e.g., smaller than 40%, etc.) of the maximal substantially vertical linear movement 911 of wheel interface 910.

In some embodiments, substantially vertical linear motion 931 of shock absorber 930 in the plane that is parallel to transverse plane 901 and substantially along reference vertical axis 900a may be smaller than substantially vertical linear movement 911 of wheel interface 910. For example, substantially vertical linear motion 931 of shock absorber 930 in the plane that is parallel to transverse plane 901 and substantially along reference vertical axis 900a may be smaller than 70% (e.g., smaller than 40%, etc.) of substantially vertical linear movement 911 of wheel interface 910.

In various embodiments, substantially vertical linear movement 911 of wheel interface 910 may equal to or larger than vertical length 910a of wheel interface 910. For example, a ration of substantially vertical linear movement 911 of wheel interface 910 over vertical length 910a of wheel interface 910 may range between 100%-300% (e.g., between 150%-250%). For example, larger vertical length 910a of wheel interface 910 may increase a rigidity of suspension assembly 903 for required wheel dynamics.

For example, for a wheel rim having a diameter of 17 inches, suspension assembly 903 may allow substantially vertical linear movement 911 of wheel interface 910 between 100-300 mm (e.g., 120-200 mm, ~150 mm), arms of linking unit of suspension assembly 903 may have a length ranging between 150-250 mm, wheel interface 910 may have a length 910a ranging between 200-300 mm and a distance between linking units located on opposite lateral sides of wheel interface 910 may range between 100-200 mm. It is to be noted that the dimensions thereof may be larger or smaller and may depend on the dimensions of the rim and/or required range of substantially vertical linear movement 911 of wheel interface 910.

Some aspects of the present invention may provide a wheel, the wheel may include a wheel suspension system as disclosed hereinabove. For example, the wheel may include any of wheel suspension systems 100, 200, 300, 400, 500, 600, 700, 800, 900 described above with respect to FIGS. 1A-1C, 2A-2E, 3A-3B, 4A-4C, 5A-5C, 6A-6C, 7, 8, 9, respectively. In various embodiments, the wheel may be of a passenger vehicle, a commercial vehicle, a toy vehicle, a sport utility vehicle.

Some aspects of the present invention may provide a vehicle, the vehicle may include at least two wheel suspension system as disclosed hereinabove. For example, the vehicle may include any of wheel suspension systems 100, 200, 300, 400, 500, 600, 700, 800, 900 described above with respect to FIGS. 1A-1C, 2A-2E, 3A-3B, 4A-4C, 5A-5C, 6A-6C, 7, 8, 9, respectively. In some embodiments, the vehicle may include at least two wheels coupled to the at least two wheel suspension systems thereof.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A wheel suspension system comprising:
a suspension assembly comprising:
  a sub-frame adapted to be connected to a reference frame of a vehicle;
  a wheel interface adapted to rotatably support a wheel of the vehicle, the wheel interface defines a wheel rotation axis and a wheel rotation plane; and
  one or more linking units each comprising:
    a first arm pivotally connected at its first end to a first end of the wheel interface using a first pivoting connection;
    a second arm pivotally connected at its first end to a second end of the wheel interface using a second pivoting connection; and
    a linking member pivotally connected at a first linking location to a second end of the first arm using a third pivoting connection, pivotally connected at a second linking location to a second end of the second arm using a fourth pivoting connection, and pivotally connected at a third linking location to the sub-frame using a fifth pivoting connection, the third linking location is at a predetermined offset from a reference axis extending between the first linking location and the second linking location;
  the first arm, the second arm and the linking member are dimensioned and positions of the first pivoting connection, the second pivoting connection, the third pivoting connection, the fourth pivoting connection, and the fifth pivoting connection, are set to cause a substantially linear motion of the wheel interface along a reference wheel interface motion axis that is perpendicular to the wheel rotation axis.

2. The wheel suspension system of claim 1, wherein the first pivoting connection, the second pivoting connection, the third pivoting connection, the fourth pivoting connection, and the fifth pivoting connection to cause rotation of the first arm, the second arm and the linking member about axes that are substantially perpendicular to the wheel rotation axis.

3. The wheel suspension system of claim 1, wherein the first arm, the second arm, and the linking member of the one or more linking units, extend in one or more co-planar planes that are substantially perpendicular to the wheel rotation plane.

4. The wheel suspension system of claim 1, further comprising one or more shock absorbers, each comprising one or more dampers and/or one or more springs.

5. The wheel suspension system of claim 4, wherein the one or more shock absorbers are pivotally connected at its first end to the sub-frame or pivotally connectable to the reference frame, and pivotally connected at its second end to one of: the first arm, the second arm, and the linking member of the one or more linking units.

6. The wheel suspension system of claim 1, further comprising a steering assembly adapted to steer at least a portion of the suspension assembly with respect to the reference frame.

7. The wheel suspension system of claim 6, wherein the steering assembly comprises:
  one or more steering arms pivotally connected at their first ends to the sub-frame of the suspension assembly and connectable at their second ends to the reference frame of the vehicle using steerable pivoting connections; and;
  a steering transmission unit pivotally connected to the sub-frame using a steerable pivoting connections.

8. The wheel suspension system of claim 6, wherein the steering assembly is capable to steer the wheel interface of the suspension assembly and wherein:
  the wheel interface comprises:
    a wheel interface coupler pivotally connected at its lateral sides to the linking member of the one or more linking units at the third linking location thereof using the fifth pivoting connection to enable the substantially linear motion of the wheel interface coupler along the reference wheel interface motion axis, and
    a wheel support member pivotally connected at one or more of its ends to one or more ends of the wheel interface coupler using one or more steerable pivoting connections to enable steering of the wheel interface; and
  the steering assembly comprises:
    a steering rod connected to the wheel support member of the wheel interface, the steering rod defines a steering axis about which the wheel support member may steer;

a steering motor for generating a rotational motion; and
a steering transmission unit for transmitting the rotational motion generated by the steering motor to the steering rod to steer the wheel interface.

9. The wheel suspension system of claim 1, further comprising a drivetrain assembly comprising at least a rotatable drivetrain shaft extending through an aperture within the wheel interface, the rotatable drivetrain shaft is capable of transmitting a rotational motion to a wheel hub coupled to the wheel interface.

10. The wheel suspension system of claim 9, wherein the drivetrain assembly further comprises:
    a drivetrain motor for generating a rotational motion; and
    a drivetrain transmission unit for transmitting the rotational motion generated by the drivetrain motor to the rotatable drivetrain shaft.

11. A wheel suspension system comprising:
    a suspension assembly comprising:
        a sub-frame adapted to be connected to a reference frame of a vehicle;
        a wheel interface adapted to rotatably support a wheel of the vehicle, the wheel interface defines a wheel rotation axis and a wheel rotation plane; and
        one or more linking units each comprising:
            a first arm pivotally connected at its first end to a first end of the sub-frame using a first pivoting connection;
            a second arm pivotally connected at its first end to a second end of the sub-frame using a second pivoting connection; and
            a linking member pivotally connected at a first linking location to a second end of the first arm using a third pivoting connection, pivotally connected at a second linking location to a second end of the second arm using a fourth pivoting connection, and pivotally connected at a third linking location to wheel interface using a fifth pivoting connection, the third linking location is at a predetermined first offset from a first reference axis extending between the first linking location and the second linking location, and a second reference axis extending between the first end of the first arm and the first end of the second arm is at a predetermined second offset from the first reference axis;
        the first arm, the second arm and the linking member are dimensioned and positions of the first pivoting connection, the second pivoting connection, the third pivoting connection, the fourth pivoting connection and the fifth pivoting connection are set to cause a substantially linear motion of the wheel interface along a reference wheel interface motion axis that is perpendicular to the wheel rotation axis.

12. The wheel suspension system of claim 11, wherein the first pivoting connection, the second pivoting connection, the third pivoting connection, the fourth pivoting connection, and the fifth pivoting connection to cause rotation of the first arm, the second arm and the linking member about axes that are substantially perpendicular to the wheel rotation axis.

13. The wheel suspension system claim 11, wherein the first arm, the second arm, and the linking member of the one or more linking units, extend in one or more co-planar planes that are substantially perpendicular to the wheel rotation plane.

14. The wheel suspension system of claim 11, further comprising one or more shock absorbers each comprising one or more dampers and/or one or more springs.

15. The wheel suspension system of claim 14, wherein the one or more shock absorbers are pivotally connected at its first end to the sub-frame or pivotally connectable to the reference frame, and pivotally connected at its second end to one of: the first arm, the second arm, and the linking member of the one or more linking units.

16. The wheel suspension system of claim 11, further comprising a steering assembly adapted to steer at least a portion of the suspension assembly with respect to the reference frame.

17. The wheel suspension system of claim 16, wherein the steering assembly comprises:
    one or more steering arms pivotally connected at their first ends to the sub-frame of the suspension assembly and connectable at their second ends to the reference frame of the vehicle using steerable pivoting connections; and
    a steering transmission unit pivotally connected to the sub-frame using a steerable pivoting connections.

18. The wheel suspension system of claim 16, wherein the steering assembly is capable to steer the wheel interface of the suspension assembly and wherein:
    the wheel interface comprises:
        a wheel interface coupler pivotally connected at its lateral sides to the linking member of the one or more linking units at the third linking location thereof using the fifth pivoting connection to enable the substantially linear motion of the wheel interface coupler along the reference wheel interface motion axis, and
        a wheel support member pivotally connected at one or more of its ends to one or more ends of the wheel interface coupler using one or more steerable pivoting connections to enable steering of the wheel interface; and
    the steering assembly comprises:
        a steering rod connected to the wheel support member of the wheel interface, the steering rod defines a steering axis about which the wheel support member may steer;
        a steering motor for generating a rotational motion; and
        a steering transmission unit for transmitting the rotational motion generated by the steering motor to the steering rod to steer the wheel interface.

19. The wheel suspension system of claim 11, further comprising a drivetrain assembly comprising at least a rotatable drivetrain shaft extending through an aperture within the wheel interface, the rotatable drivetrain shaft is capable of transmitting a rotational motion to a wheel hub coupled to the wheel interface.

20. The wheel suspension system of claim 19, wherein the drivetrain assembly further comprises:
    a drivetrain motor for generating a rotational motion; and
    a drivetrain transmission unit for transmitting the rotational motion generated by the drivetrain motor to the rotatable drivetrain shaft.

* * * * *